United States Patent
Zhang et al.

(10) Patent No.: US 12,361,375 B2
(45) Date of Patent: Jul. 15, 2025

(54) SYSTEMS AND METHODS OF UPDATING MODEL TEMPLATES ASSOCIATED WITH IMAGES OF RETAIL PRODUCTS AT PRODUCT STORAGE FACILITIES

(71) Applicant: Walmart Apollo, LLC, Bentonville, AR (US)

(72) Inventors: Han Zhang, Allen, TX (US); Abhinav Pachauri, Kanpur (IN); Raghava Balusu, Achanta (IN); Ashlin Ghosh, Ernakulam (IN); Avinash M. Jade, Bangalore (IN); Lingfeng Zhang, Dallas, TX (US); Srinivas Muktevi, Bengaluru (IN); Amit Jhunjhunwala, Bangalore (IN); Zhaoliang Duan, Frisco, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 347 days.

(21) Appl. No.: 18/102,999

(22) Filed: Jan. 30, 2023

(65) Prior Publication Data
US 2024/0257043 A1   Aug. 1, 2024

(51) Int. Cl.
G06Q 10/087   (2023.01)
G06V 20/60   (2022.01)

(52) U.S. Cl.
CPC .......... *G06Q 10/087* (2013.01); *G06V 20/60* (2022.01); *G06V 2201/07* (2022.01)

(58) Field of Classification Search
CPC ... G06Q 10/087; G06V 20/60; G06V 2201/07
See application file for complete search history.

(56) References Cited

U.S. PATENT DOCUMENTS 5,074,594 A   12/1991   Laganowski
6,570,492 B1   5/2003   Peratoner
(Continued)

FOREIGN PATENT DOCUMENTS

CN   106347550 B   8/2019
CN   110348439 B   10/2019
(Continued)

OTHER PUBLICATIONS

U.S. Appl. No. 17/963,751, filed Oct. 11, 2022, Yilun Chen.
(Continued)

*Primary Examiner* — A. Hunter Wilder
(74) *Attorney, Agent, or Firm* — Foley IP Law, PLLC

(57) ABSTRACT

Systems and methods of updating templates for use in recognizing individual products in images captured at a product storage facility include an image capture device that captures one or more images of product storage structure at a product storage facility, a computing device in communication with the image capture device, and an electronic database that stores keyword model templates and feature model templates associated with images of previously recognized individual products detected at the product storage facility. The computing device obtains the keyword and feature model templates associated with a recognized product from the electronic database, extracts the keywords from the products associated with the obtained keyword model templates, identifies products that are similar to the recognized product, and updates the keyword model template for each of the products to include must keywords and negative keywords, facilitating recognition of products in subsequent images captured by the image capture device.

18 Claims, 14 Drawing Sheets

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2010/0208941 A1 | 8/2010 | Broaddus et al. |
| 2011/0040427 A1 | 2/2011 | Ben-Tzvi |
| 2014/0002239 A1 | 1/2014 | Rayner |
| 2014/0247116 A1 | 9/2014 | Davidson |
| 2014/0307938 A1 | 10/2014 | Doi |
| 2015/0363660 A1 | 12/2015 | Vidal |
| 2016/0191856 A1 | 6/2016 | Huang et al. |
| 2016/0203525 A1 | 7/2016 | Hara |
| 2017/0106738 A1 | 4/2017 | Gillett |
| 2017/0286773 A1 | 10/2017 | Skaff |
| 2018/0005176 A1 | 1/2018 | Williams |
| 2018/0018788 A1 | 1/2018 | Olmstead |
| 2018/0108134 A1 | 4/2018 | Venable |
| 2018/0197223 A1 | 7/2018 | Grossman |
| 2018/0260772 A1 | 9/2018 | Chaubard |
| 2019/0025849 A1 | 1/2019 | Dean |
| 2019/0043003 A1 | 2/2019 | Fisher |
| 2019/0050932 A1 | 2/2019 | Dey |
| 2019/0066185 A1 | 2/2019 | More et al. |
| 2019/0087772 A1 | 3/2019 | Medina |
| 2019/0107880 A1 | 4/2019 | Jung |
| 2019/0163698 A1 | 5/2019 | Kwon |
| 2019/0197561 A1 | 6/2019 | Adato |
| 2019/0220482 A1 | 7/2019 | Crosby |
| 2019/0236531 A1 | 8/2019 | Adato |
| 2020/0117884 A1* | 4/2020 | Adato ............... G06T 7/20 |
| 2020/0118063 A1 | 4/2020 | Fu |
| 2020/0246977 A1 | 8/2020 | Swietojanski |
| 2020/0265494 A1 | 8/2020 | Glaser |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1 | 9/2021 | Suzuki |
| 2021/0319684 A1 | 10/2021 | Ma |
| 2021/0342914 A1 | 11/2021 | Dalal |
| 2021/0400195 A1 | 12/2021 | Adato |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0230220 A1* | 7/2022 | Hong ............... G06Q 30/0625 |
| 2022/0262008 A1 | 8/2022 | Kidd |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

U.S. Appl. No. 17/963,787, filed Oct. 11, 2022, Lingfeng Zhang.
U.S. Appl. No. 17/963,802, filed Oct. 11, 2022, Lingfeng Zhang.
U.S. Appl. No. 17/963,903, filed Oct. 11, 2022, Raghava Balusu.
U.S. Appl. No. 17/966,580, filed Oct. 14, 2022, Paarvendhan Puviyarasu.
U.S. Appl. No. 17/971,350, filed Oct. 21, 2022, Jing Wang.
U.S. Appl. No. 17/983,773, filed Nov. 9, 2022, Lingfeng Zhang.
U.S. Appl. No. 18/103,338, filed Jan. 30, 2023, Wei Wang.
U.S. Appl. No. 18/106,269, filed Feb. 6, 2023, Zhaoliang Duan.
U.S. Appl. No. 18/158,925, filed Jan. 24, 2023, Raghava Balusu.
U.S. Appl. No. 18/158,950, filed Jan. 24, 2023, Ishan Arora.
U.S. Appl. No. 18/158,969, filed Jan. 24, 2023, Zhaoliang Duan.
U.S. Appl. No. 18/158,983, filed Jan. 24, 2023, Ashlin Ghosh.
U.S. Appl. No. 18/161,788, filed Jan. 30, 2023, Raghava Balusu.
U.S. Appl. No. 18/165,152, filed Feb. 6, 2023, Han Zhang.
U.S. Appl. No. 18/168,174, filed Feb. 13, 2023, Abhinav Pachauri.
U.S. Appl. No. 18/168,198, filed Feb. 13, 2023, Ashlin Ghosh.
Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.
Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 1-6.
Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; pp. 1-11 pages.
Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-15.
Paolanti, Marine et al.; "Mobile robot for retail surveying and inventory using visual and textual analysis of monocular pictures based on deep learning"; European Conference on Mobile Robots; Sep. 2017, 6 pages.
Refills; "Final 3D object perception and localization"; European Commision, Dec. 31, 2016, 16 pages.
Retech Labs; "Storx | RetechLabs"; <https://retechlabs.com/storx/>; available at least as early as Jun. 22, 2019; retrieved from

(56) References Cited

OTHER PUBLICATIONS

Internet Archive Wayback Machine <https://web.archive.org/web/20190622012152/https://retechlabs.com/storx/> on Dec. 1, 2022; pp. 1-4.
Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.
Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.
Singh, Ankit; "Image Recognition and Object Detection in Retail"; <https://blog.paralleldots.com/featured/image-recognition-and-object-detection-in-retail/>; Sep. 26, 2019; pp. 1-11.
Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.
Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.
Technology Robotix Society; "Colour Detection"; <https://medium.com/image-processing-in-robotics/colour-detection-e15bc03b3f61>; Jul. 2, 2019; pp. 1-6.
Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.
Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.
Verma, Nishchal, et al.; "Object identification for inventory management using convolutional neural network"; IEEE Applied Imagery Pattern Recognition Workshop (AIPR); Oct. 2016, 6 pages.
Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.
Rodriquez, Kari, "International Search Report & Written Opinion", International Application No. PCT/US24/12335, mailed Apr. 30, 2024, 9 pages.

\* cited by examiner

FIG. 12A

191g → 0001034953840 ← 195g epson [702] emballage
economique lmixte combo value
pack vsion exceed [702] lepson
conomique lemballage lmixte
combo pack vision [702]
epson lpso emballage conomique
mixte exceed [702] ← 199g
epson economique lemballage
combo pack value mixte exceed
your 288 288xl 220 252 252xl
⎵
197g

[288] epson [288xl] emballage
economique combo value mixte pack
epson [288] conomique [288xl]
emballage value combo mixte pack
visio epson [288xl] 288 your vision ← 199h
emballage economique combo pack
mixte value exceed epson
emballage value combo mixte
pack economique 702 220 252 252xl
⎵
197h

[220] epson emballage combo mixte
value economique pack ← 199i
epson [220] economique emballage
combo value mixte
[220] epson emballage
value economique combo pack
epson mixte exceed your vision
702 288 288xl 252 252xl
⎵
197i

FIG. 12D

191j → 0001034917965 ← 195j epson [252][252xl] emballage
economique value combo mixte
pack [252][252xl] epson
economique emballage combo value ← 199j
mixte pack lepson [252][252xl]
emballage economique value combo
pack mixte epson combo value
[252] emballage economique pack
mixte exceed your vision [252xl]
702 288 288xl 220
⎵
197j

SYSTEMS AND METHODS OF UPDATING MODEL TEMPLATES ASSOCIATED WITH IMAGES OF RETAIL PRODUCTS AT PRODUCT STORAGE FACILITIES

TECHNICAL FIELD

This disclosure relates generally to managing inventory at product storage facilities, and in particular, to updating templates for use in recognizing products in images captured at a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to verify which of the on-shelf price tag labels are match with which of the on-shelf products, and whether the shelves storing the on-shelf products are correctly labeled with appropriate price tag labels.

Given the large number of product storage areas such as shelves, pallets, and other product displays at product storage facilities of large retailers, and the even larger number of products stored in the product storage areas, manual inspection of the price tag labels and the products on the product storage structures at the product storage facilities by the workers is very time consuming and significantly increases the operations cost for a retailer, since these workers could be performing other tasks if they were not involved in manually inspecting the product storage structures, price tag labels, and products.

On the other hand, optical character-based recognition of on-shelf product labels and on-shelf products based on hundreds or thousands of images captured at hundreds/thousands of product storage facilities, each of the images depicting a distinct on-shelf product label or on-shelf product requires significant system resources and/or high processing costs for large retailers, some of these costs being associated with the training and retraining of image recognition models for recognizing products in images of product structures captured at the product storage facilities of the retailers by image capture devices.

BRIEF DESCRIPTION OF THE DRAWINGS

Disclosed herein are embodiments of systems and methods of updating templates for use in recognizing products in images captured at a product storage facility. This description includes drawings, wherein:

FIGS. 12A-12D are diagrams of the characters (keywords and numbers) extracted from the four exemplary products of FIGS. 11A-11D, with FIG. 12A showing the must keywords and the negative keywords for the product of FIG. 11A.

Figure 1:
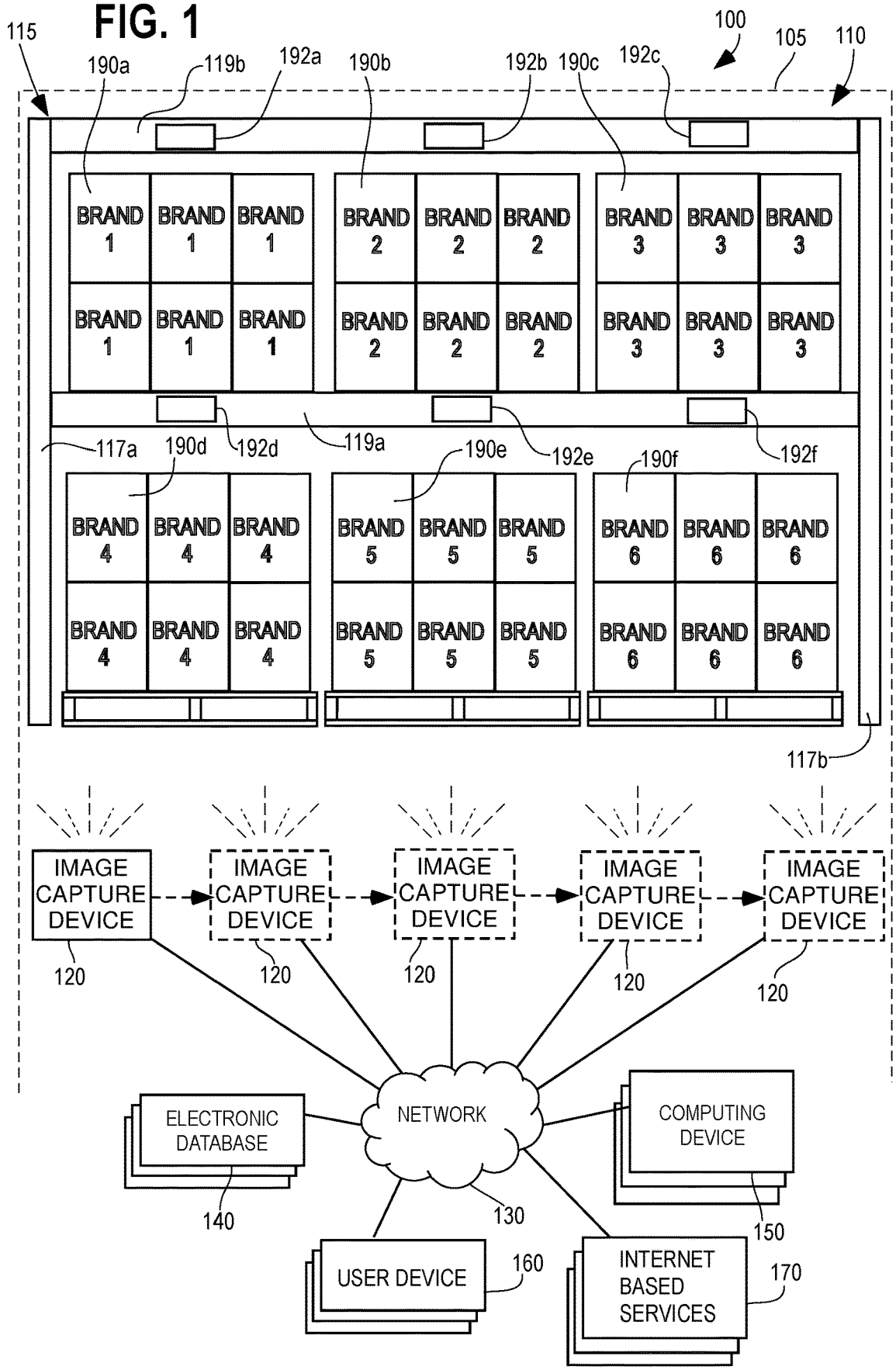
FIG. 1 is a diagram of an exemplary system of updating templates for use in recognizing products in images captured at a product storage facility in accordance with some embodiments, depicting a front view of a product storage structure storing various products thereon, the product storage structure being monitored by an image capture device that is configured to move about the product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Systems and methods of updating templates for use in recognizing products in images captured at a product storage facility include an image capture device that captures one or more images of product storage structure at a product storage facility, a computing device in communication with the image capture device, and an electronic database that stores keyword model templates and feature model templates associated with images of previously recognized individual products detected at the product storage facility. The computing device obtains the keyword and feature model templates associated with a recognized product from the electronic database, extracts the keywords from the products associated with the obtained keyword model templates, identifies products that are similar to the recognized product, and updates the keyword model template for each of the products to include must keywords and negative keywords, facilitating recognition of products in subsequent images captured by the image capture device.

In some embodiments, systems of updating templates for use in recognizing individual products in images captured at a product storage facility include an image capture device having a field of view that includes at least a portion of a product storage structure of the product storage facility, the product storage structure having the individual products arranged thereon, wherein the image capture device is configured to capture one or more images of the product storage structure, a computing device including a control circuit, the computing device being communicatively coupled to the image capture device, and an electronic database configured to store keyword model templates and feature model templates associated with the images of previously recognized individual products stored at the product storage facility, wherein the keyword model templates includes an image of a recognized individual product and meta data associated with the recognized individual product, and wherein the feature model templates include the image of the recognized product in association with visual features of the recognized product. The control circuit of the computing device is configured to obtain at least one of the keyword model templates and feature model templates stored in the electronic database; extract one or more keywords from each of the individual recognized products depicted in the captured images associated with the obtained keyword model templates; correlate the keywords extracted from each of the individual recognized products depicted in the images associated with the obtained keyword model templates to identify similar products, where the similar products share a number of keywords with each other and do not share a number of keywords with each other; update a keyword model template for each of the similar products to set the keywords that are unique to the similar recognized products as must keywords and to set the must keywords that are not shared between the similar recognized products as negative keywords; and transmit the updated keyword model template including the must keywords and the negative keywords for each of the similar recognized products to the electronic database for storage to be used for analysis of subsequent images captured by the image capture device, and recognition of the products in the subsequent images.

In some embodiments, a method of updating templates for use in recognizing individual products in images captured at a product storage facility includes: capturing one or more images of a product structure of the product storage facility by an image capture device having a field of view that includes at least a portion of the product storage structure, the product storage structure having the individual products arranged thereon; storing, in an electronic database, keyword model templates and feature model templates associated with the images of previously recognized individual products stored at the product storage facility, wherein the keyword model templates includes an image of a recognized individual product and meta data associated with the recognized individual product, and wherein the feature model templates include the image of the recognized product in association with visual features of the recognized product; and, by a computing device including a control circuit and communicatively coupled to the image capture device: obtaining at least one of the keyword model templates and feature model templates stored in the electronic database; extracting one or more keywords from each of the individual recognized products depicted in the captured images associated with the obtained keyword model templates; correlating the keywords extracted from each of the individual recognized products depicted in the images associated with the obtained keyword model templates to identify similar products, where the similar products share a number of keywords with each other and do not share a number of keywords with each other; updating a keyword model template for each of the similar products to set the keywords that are unique to the similar recognized products as must keywords and set the must keywords that are not shared between the similar recognized products as negative keywords; and transmitting the updated keyword model template including the must keywords and the negative keywords for each of the similar recognized products to the electronic database for storage to be used for analysis of subsequent images captured by the image capture device, and recognition of the products in the subsequent images.

FIG. 1 shows an embodiment of a system 100 of updating model templates for use in recognizing individual products 190a-190f stored on product storage structures 115 of a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that, depending on the size of the product storage facility 105 being monitored, the system 100 may include multiple movable image capture devices 120 located at the product storage facility 105 that monitor hundreds or thousands of product storage areas 110 and product storage structures 115.

It is understood that the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, the term "product storage structure" as used herein generally refers to a structure on which products 190a-190f are stored, and may include a pallet, a shelf cabinet, a single shelf, table, rack, refrigerator, freezer, displays, bins, gondola, case, countertop, or another product display. Likewise, it will be appreciated that the number of individual products 190a-190f representing six individual units of each of six different exemplary products (generically labeled as "Brand 1," "Brand 2," "Brand 3," "Brand 4," Brand 5," and "Brand 6") is chosen for simplicity and by way of example only, and that the product storage structure 115 may store more or less than six units of each of the products 190a-190f. Further, the size and shape of the products 190a-190f in FIG. 1 have been shown by way of example only, and it will be appreciated that the individual products 190a-190f may have various sizes and shapes.

Notably, the term "product storage structure" as used herein generally refers to a structure on which products 190a-190f are stored, and may include a pallet, a shelf cabinet, a single shelf, table, rack, refrigerator, freezer, displays, bins, gondola, case, countertop, or another product display. Likewise, it will be appreciated that the number of individual products 190a-190f representing six individual units of each of six different exemplary products (generically labeled as "Brand 1," "Brand 2," "Brand 3," "Brand 4," Brand 5," and "Brand 6") is chosen for simplicity and by way of example only, and that the product storage structure 115 may store more or less than six units of each of the products 190a-190f. Further, the size and shape of the products 190a-190f in FIG. 1 have been shown by way of example only, and it will be appreciated that the individual products 190a-190f may have various sizes and shapes.

Notably, the term "products" may refer to individual products 190a-190f (some of which may be single-piece/single-component products and some of which may be multi-piece/multi-component products), as well as to packages or containers of products 190a-190f, which may be plastic- or paper-based packaging that includes multiple units of a given product 190a-190f (e.g., a plastic wrap that includes 36 rolls of identical paper towels, a paper box that includes 10 packs of identical diapers, etc.). Alternatively, the packaging of the individual products 190a-190f may be a plastic- or paper-based container that encloses one individual product 190a-190f (e.g., a box of cereal, a bottle of shampoo, etc.).

Notably, while the product labels 192a-192f may be referred to herein as "on-shelf product labels" or "on-shelf price tag labels," it will be appreciated that the product labels 192a-192f do not necessarily have to be affixed to horizontal support members 119a or 119b (which may be shelves, etc.) of the product storage structure 115 as shown in FIG. 1 and may be located in a different location (e.g., on the vertical support members 117a-117b (which may be support posts interconnecting the shelves).

The image capture device 120 (also referred to as an image capture unit or a motorized robotic unit) of the exemplary system 100 depicted in FIG. 1 may be configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as a robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which may be independent of capturing images of product storage areas 110 of the product storage facility 105.

In some embodiments, as will be described in more detail below, the images 180 of the product storage area 110 captured by the image capture device 120 while moving about the product storage area 110 are transmitted by the image capture device 120 over a network 130 to an electronic database 140 and/or to a computing device 150. In some aspects, the computing device 150 (or a separate image processing internet based/cloud-based service module) may be configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, vertical and horizontal support member positional coordinate database, cropped images database, stitched images database, unstitched images database, pricing database, customer database, vendor database, manufacturer database, etc.) and may be configured to store various raw and processed images (e.g., 180, 182, 184, 186) of the product storage structure 115 captured by the image capture device 120 while the image capture device 120 may be moving about the product storage facility 105. In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
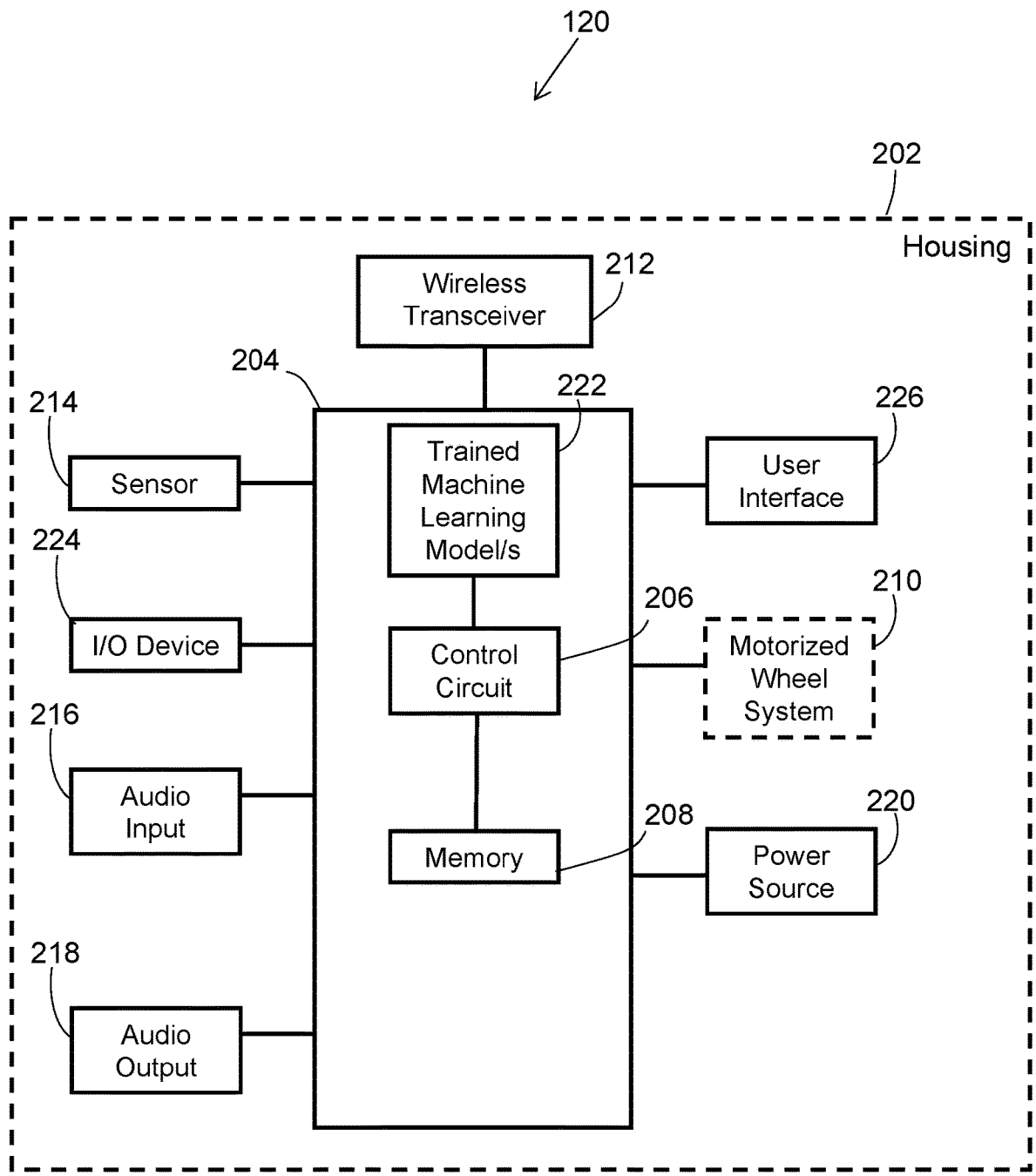
FIG. 2 comprises a block diagram of an exemplary image capture device in accordance with some embodiments.

FIG. 2 presents a more detailed example of an exemplary motorized robotic image capture device 120. As mentioned above, the image capture device 120 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, may be optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 may be configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 may be configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 206 may be trained to process one or more images 180 of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 may be a motorized robotic device capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
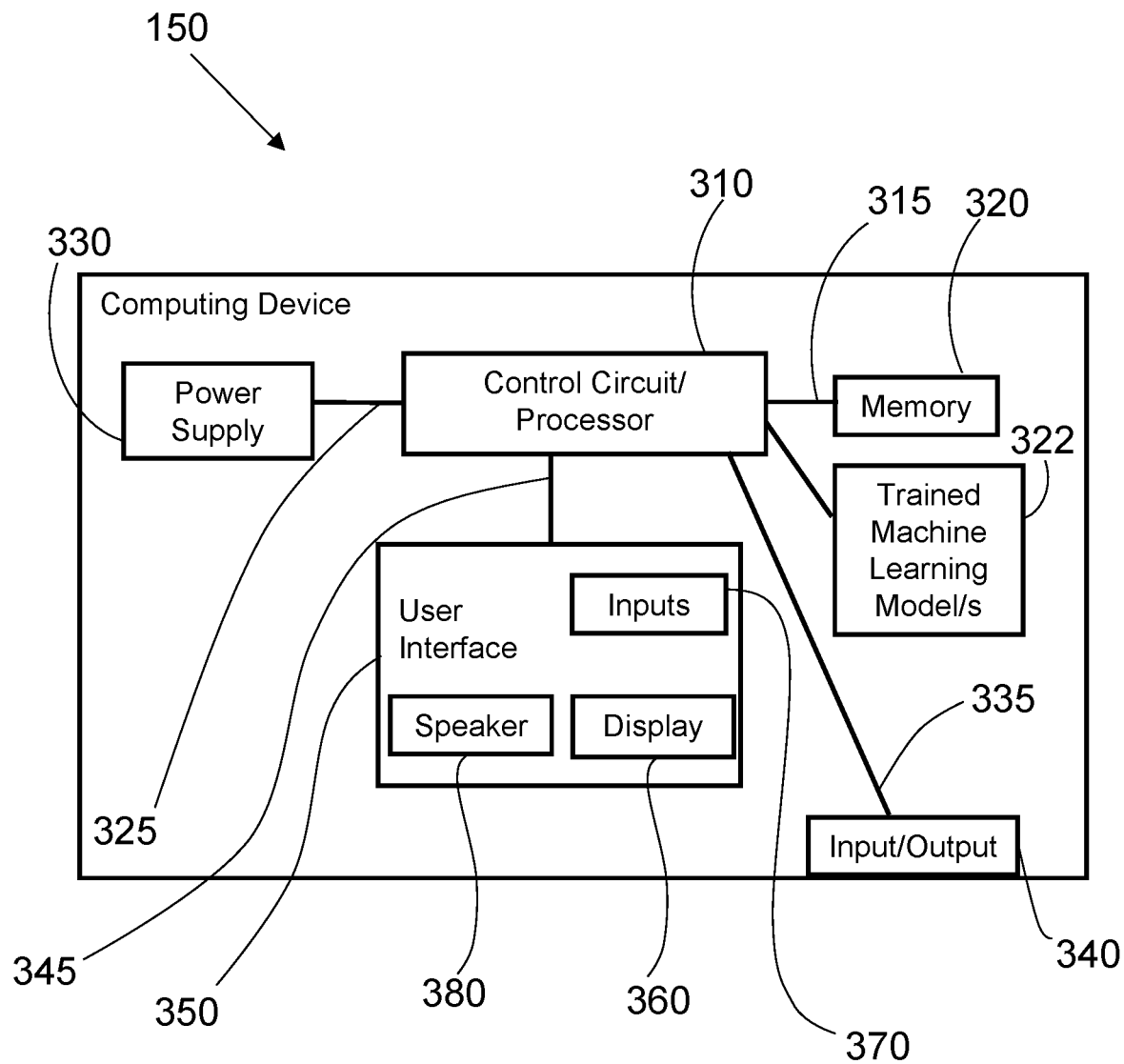
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
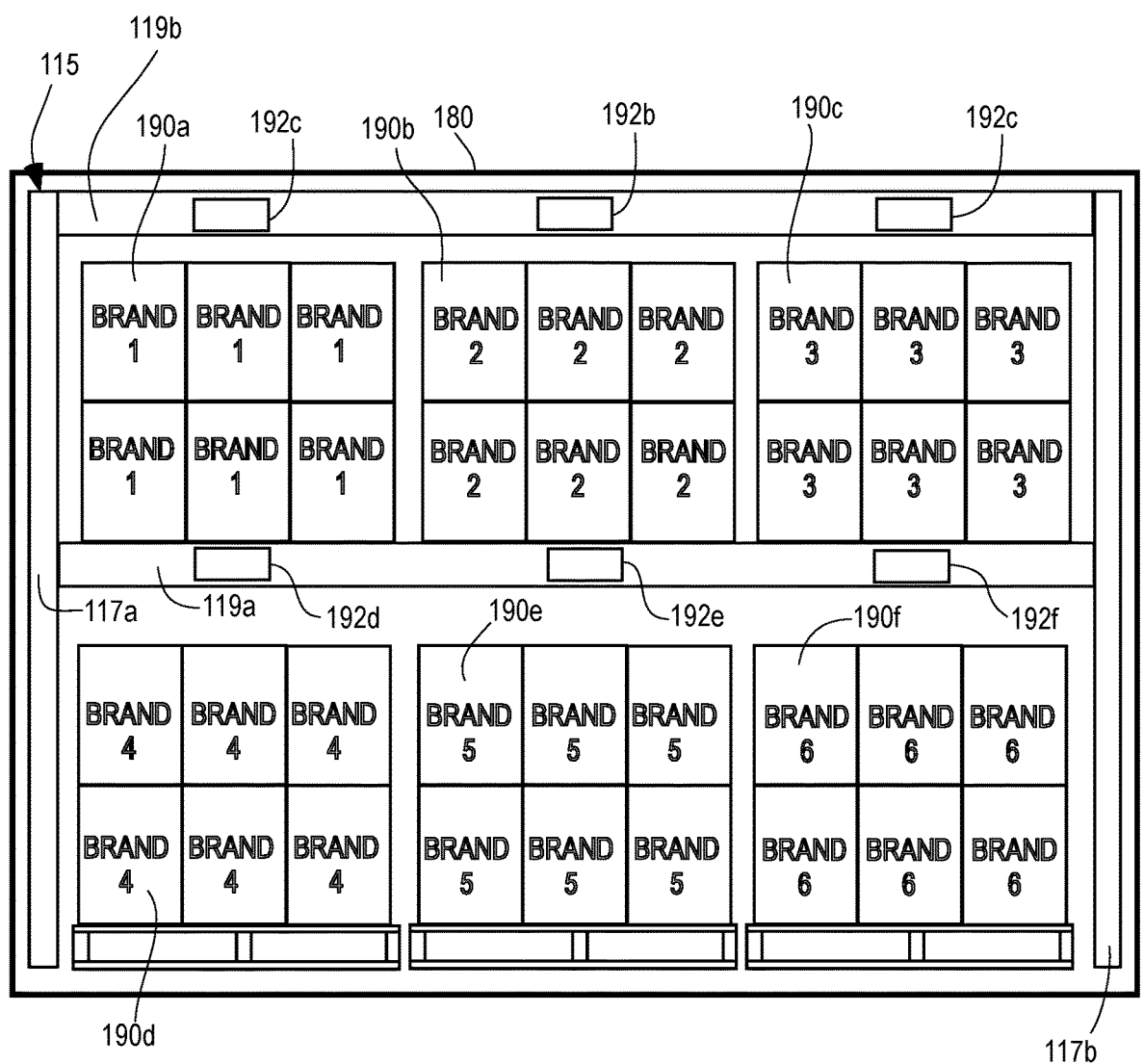
FIG. 4 is a diagram of an exemplary image of the product storage structure of FIG. 1 taken by the image capture device, showing the product storage structure of FIG. 1 and all of the products thereon.
Figure 5:
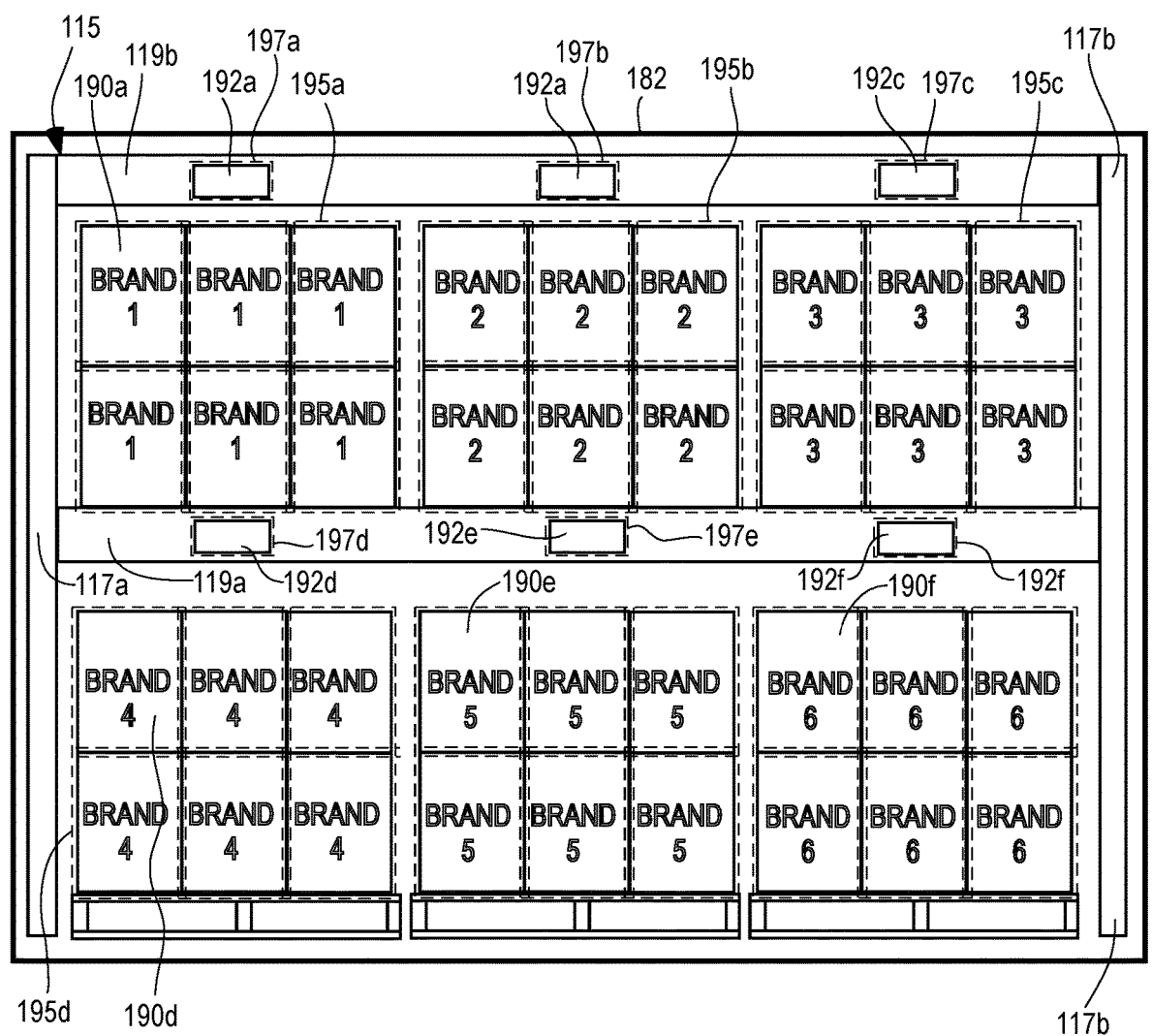
FIG. 5 is a diagram of the exemplary image of FIG. 4, after the image is processed to detect the individual products located on the product storage structure and to generate virtual boundary lines around each of the products detected in the image.
Figure 6A:
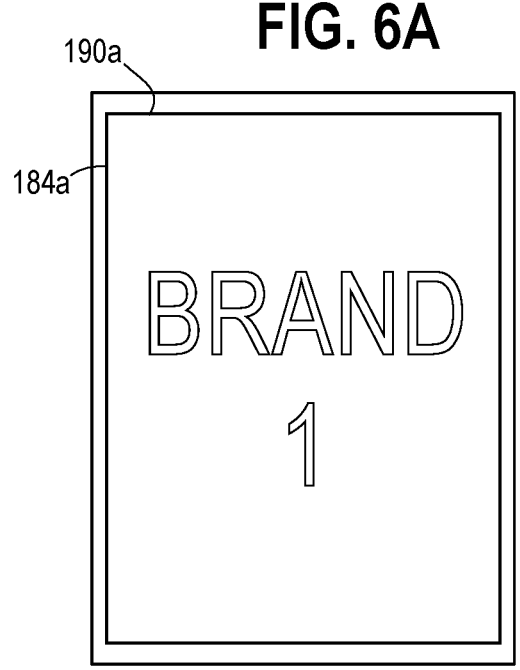
FIGS. 6A-6F are diagrams of enlarged portions of the images cropped out from the image of FIG. 5, after the image of FIG. 5 is processed to crop out individual ones of the products.
Figure 6B:
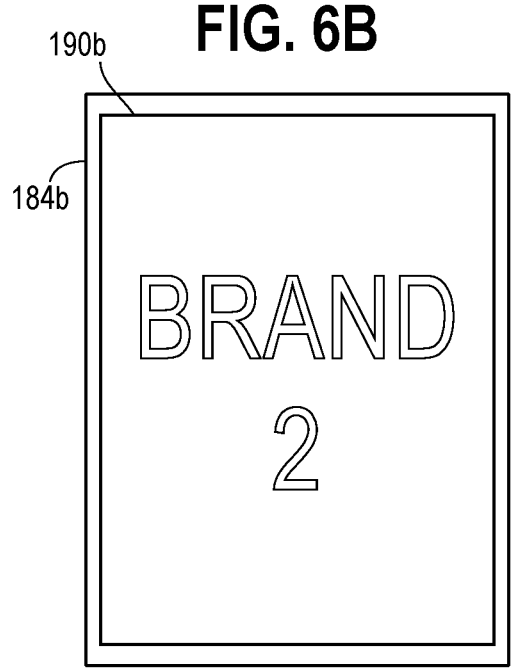
Figure 6C:
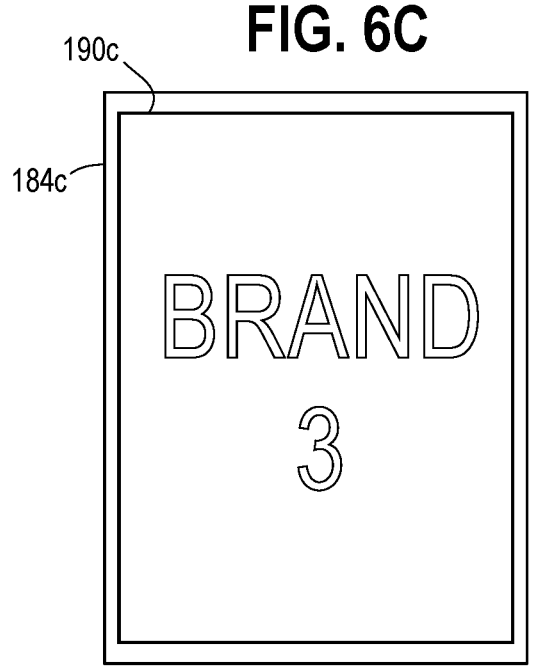
Figure 6D:
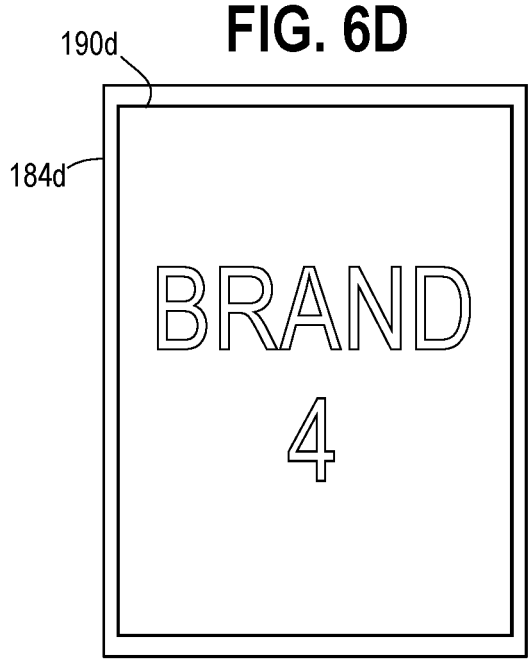
Figure 6E:
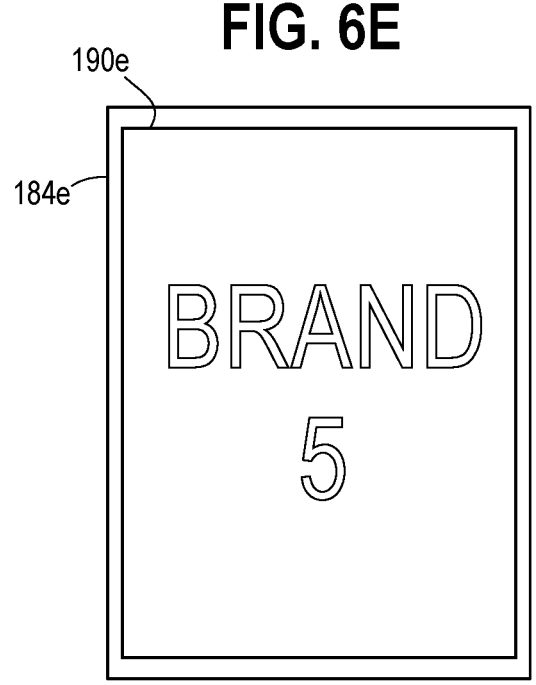
Figure 6F:
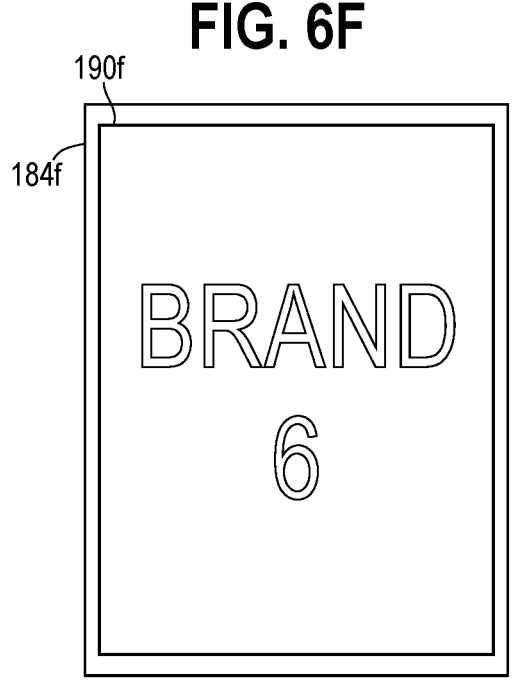

The control circuit 310 of the computing device 150 may be also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190 stocked thereon). The input/output 340 of the computing device 150 can also send signals to other devices, for example, a signal to the electronic database 140 including a raw image 180 of a product storage structure 115 as shown in FIG. 4, or a processed image 182 of the product storage structure 115 as shown in FIG. 5, or a cropped image 184a-184f of a product 190a-190f as shown in FIGS. 6A-6F. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory and/or ensuring the products 190a-190f are correctly labeled with the product labels 192a-192f at the product storage facility 105 to manually control the computing device 150 by inputting commands via touch-screen and/or button operation and/or voice commands. Possible commands may, for example, cause the computing device 150 to cause transmission of an alert signal to electronic mobile user device/s 160 of a worker/s at the product storage facility 105 to assign a task to the worker that requires the worker to, e.g., visually inspect and/or relabel a given product storage structure 115 based on analysis by the computing device 150 of the image 180 of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 may be not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain embodiments, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more images 180 of the product storage area 110 captured by the image capture device 120 while moving about the product storage area 110. In particular, in some embodiments, the control circuit 310 of the computing device 150 is programmed to process a raw image 180 shown in FIG. 4 (which may be captured by the image capture device 120 (as depicted in FIG. 1) and obtained by the computing device 150 from the electronic database 140, or from the image capture device 120) to extract the raw image data and meta data from the image 180. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190a-190f and the price tag labels 192a-192f depicted in the image 180.

With reference to FIGS. 4 and 5, in some aspects, the control circuit 310 of the computing device 150 may be configured to process the data extracted from the image 180 captured by the image capture device 120 to detect the overall size and shape of each of the individual products 190a-190f and product (e.g., price tag) labels 192a-192f located on the product storage structure 115 captured in the image 180. In some embodiments, the control circuit 310 is configured to process the data extracted from the image 180 and detect each of the individual products 190a-190f and product labels 192a-192f in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference images of various products 190a-190f stocked and/or sold at the product storage facility 105; and reference images of various product labels 192a-192f applied to product storage structures 115 (or to products 190a-190f) at product storage facility 105.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing may be performed by an internet-based service 170, after which the processed image 182 may be obtained by the control circuit 310 for further analysis.

In some embodiments, the control circuit 310 is configured to process the data extracted from the image 180 via computer vision and one or more trained neural networks to detect each of the individual products 190a-190f and each of the individual price tag labels 192a-192f located on the product storage structure 115 in the image 180, and to generate virtual boundary lines 195a-195f (as seen in image 182 in FIG. 5) around each one of the individual products 190a-190f detected in the image 180. By the same token, in some aspects, the control circuit 310 is configured to process the data extracted from the image 180 via computer vision and one or more trained neural networks to detect each one of the individual product (in this exemplary case, price tag) labels 192a-192f located on the product storage structure 115 in the image 180, and to generate a virtual boundary line 197a-197f (as seen in image 182 in FIG. 5) around each of the individual product labels 192a-192f detected in the image 180. Notably, the terms "virtual boundary lines" and "virtual bounding boxes" are used interchangeably herein.

It is understood that as used herein, the term "bounding box" is intended to be any shape that surrounds or defines boundaries about a detected object in an image. That is, a bounding box may be in the shape of a square, rectangle, circle, oval, triangle, and so on, or may be any irregular shape having curved, angled, straight and/or irregular sections within which the object is located, the irregular shape may loosely conform to the shape of the object or not. Further, a bounding box may not be complete in that it could include open sections (such that the bounding box is formed by connecting the dots). In any event, embodiments of a bounding box can be defined as a shape that surrounds or defines boundaries about a detected object. And generally, to illustrate examples of some embodiments in one or more figures, bounding boxes are illustrated in square or rectangular form.

As seen in the image 182 in FIG. 5, the virtual boundary lines 195a-195f extend about the outer edges of each of the individual products 190a-190f located on the product storage structure 115, and form a perimeter around each of the individual products 190a-190f. Similarly, the virtual boundary lines 197a-197f extend about the outer edges of each of the individual price tag labels 192a-192f located on the product storage structure 115, and form a perimeter around each of the individual price tag labels 192a-192f. Generally, the control circuit 310 may be programmed to interpret each of the virtual boundary lines 195a-195f as surrounding only one individual product 190a-190f, and to interpret each of the virtual boundary lines 197a-197f as surrounding only one individual price tag label 192a-192f.

In some embodiments, after generating the virtual boundary lines 195a-195f around the products 190 and the virtual boundary lines 197a-197f around the price tag labels 192a-192f, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model as a reference model of a visual representation of the product storage structure 115 and/or products 190a-190f and/or price tag labels 192a-192f.

More specifically, in some implementations, the control circuit 310 is programmed to perform object detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190a-190f and/or price tag labels 192a-192f by a worker of the product storage facility 105, and in response to an input received from an electronic user device 160 of the worker.

In certain embodiments, as will be discussed in more detail below with reference to FIGS. 6A-9B, after the control circuit 310 detects the products 190a-190f and the price tag labels 192a-192f on the product storage structure 115 in images 180 and 182, the control circuit 310 is programmed to process the image 180 to crop out the detected products 190a-190f and product labels 192a-192f. As mentioned above, while FIG. 4 shows (for ease of illustration) only one image 180 of the product storage structure 115 and describes the analysis of this image 180 by the control circuit 310 of the computing device 150, it will be appreciated that, in some embodiments, the control circuit 310 may process and analyze dozens or hundreds of images 180 of the product storage structure 115 (and, in some aspects, dozens or hundreds of other product storage structures 115 at the product storage facility 105) that are captured (at pre-determined intervals) by the image capture device 120 while moving about the product storage facility 105, and the images 180 may be processed by the control circuit 310 as raw images 180 or as processed images 182 (e.g., pre-processed by an image-processing and/or neural network-based internet-based service 170).

In some implementations, after the image 180 obtained by the computing device 150 is processed by the control circuit 310 as described above to generate the image 182 of FIG. 5 including virtual boundary lines 195a-195f around each of the individual products 190a-190f and virtual boundary lines 197a-197f around each of the individual price tag labels 192a-192f, the control circuit 310 is programmed to further process the image 182 to crop each individual product 190a-190f from the image 182 and to crop each individual product (e.g., price tag) label 192a-192f from the image 182, thereby resulting in images 184a-184f (depicting the product labels 192a-192f) and images 184a-184f depicting the products 190a-190f, as shown in FIGS. 6A-6F. It is understood that processing the image 182 to crop each individual product 190a-190f from the image 182 and create the cropped images 184a-184f is one example of the image processing that may be performed by the control circuit 310, and that, in some embodiments, instead of cropping out an image 184a-184f of the product 190 from the image 182, the control circuit 310 may copy/record the pixel data corresponding to the corresponding product 190a-190f in the image 182, and just use the pixel data associated with the product 190a-190f instead of using the cropped image 184a-184a depicting the products 190a-190f.

Then, as discussed in more detail below, the control circuit 310 further processes the cropped images 184a-184f depicting the products 190a-190f (or pixel data representing the product 190) as discussed in more detail below to create one or more reference model templates based on the processed images 184a-184f that are stored in the electronic database 140 to facilitate recognition/identification of products 190a-190f subsequently captured on the product storage structure 115 by the image capture device 120. In particular, in some embodiments, the control circuit 310 creates a cluster of the cropped images (see FIG. 8), such that each of the cropped images in the cluster depicts one of the identified individual products 190a-190f (e.g., from the same perspective or from a different angle). To that end, in some embodiments, the control circuit 310 is programmed to process each of the cropped images 184a-184f to generate embeddings 187 (see FIG. 7) for each of the cropped images 184a-184f, with the embeddings 187 being dense vector representations of the cropped images 184a-184f.

Figure 7:
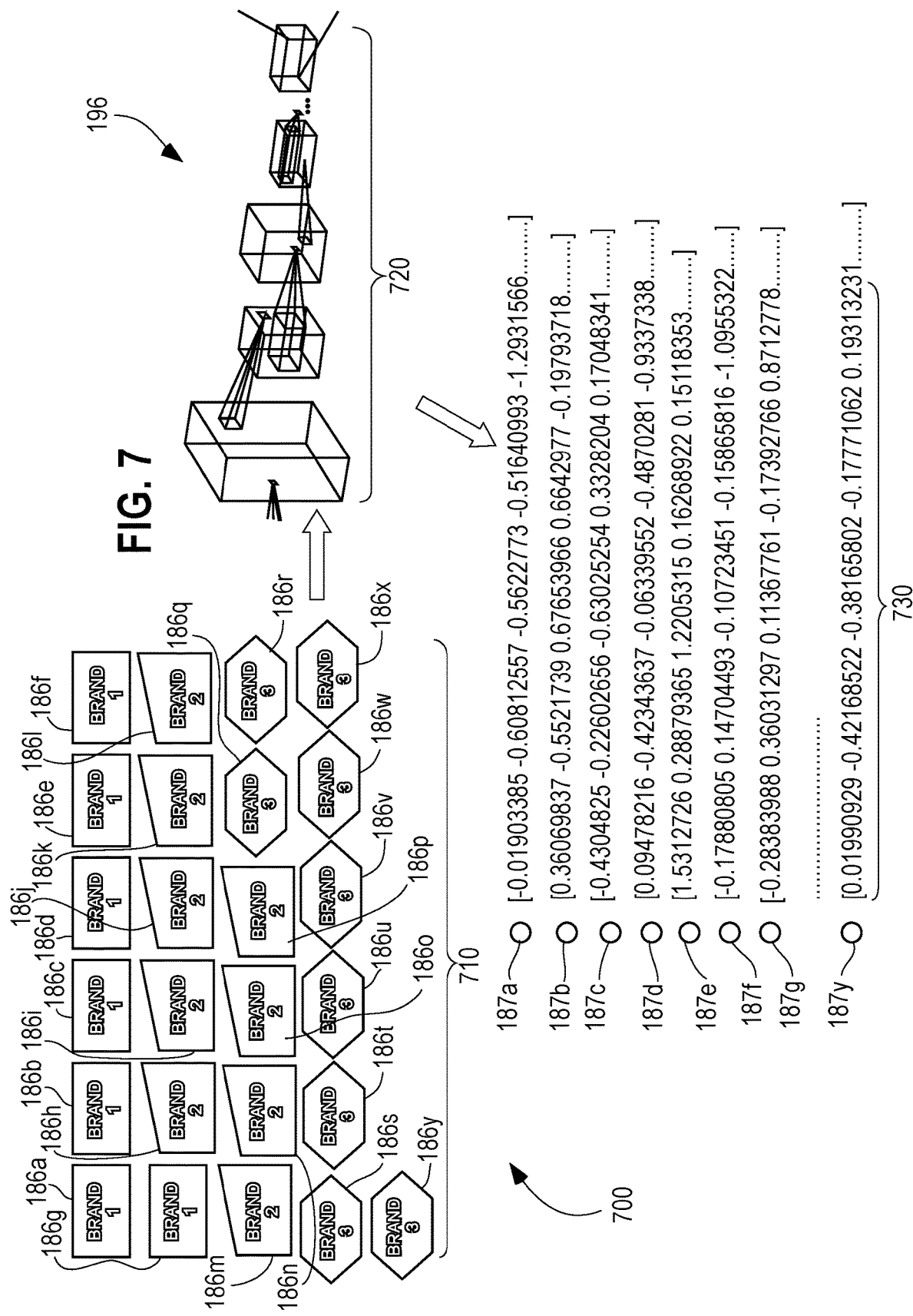
FIG. 7 is a flow diagram of an exemplary process of generating embeddings for a cropped images of individual products in accordance with some embodiments.

For example, FIG. 7 represents an exemplary process 700 of generating the embeddings 187 for cropped images 186a-186y corresponding to individual units of three different products 190a-190c, i.e., "BRAND 1," "BRAND 2," and "BRAND 3." In the first step of this exemplary process 700, the control circuit 310 obtains cropped images 186a-186y of individual units of these three different products 190a-190c, which were generated as described above with reference to FIGS. 4 and 5 (step 710). In FIG. 7, in step 710, the control circuit 310 obtains 25 separate cropped images 186, where the first seven cropped images (i.e., 186a-186g) depict the first product 190a with the name "BRAND 1," the second nine cropped images (i.e., 186h-186p) depict the second product 190b with the name "BRAND 2," and the remaining nine cropped images (i.e., 186q-186y) depict the third product 190c with the name "BRAND 3."

In the exemplary method 700, after the cropped images 186a-186y are obtained in step 710, the control circuit 310 passes the cropped images 186a-186y through a neural network 196. The neural network may be a convolutional neural network. In one aspect, the convolutional neural network (CNN) may be pretrained to extract predetermined features from the cropped images 186a-186y (720) and, based on the features extracted from each of the cropped images 186a-186y, the CNN may be pretrained to generate lower dimensional representations for each of the cropped images 186a-186y (step 730). For example, step 730 of the method 700 may include the CNN converting the features extracted from each of the cropped images 186a-186y into dense vector representations, also known as embeddings 187, for each of the textual features extracted from each of the cropped images 186a-186y.

In the illustrated embodiment, each of the dense vector representations or embeddings 187 is a numerical representation (i.e., represented by a set of numbers), which may be representative of 128 (or less or more) dimensions. These numeral representations or embeddings 187 reflect the visual information (i.e., predetermined features) extracted from the cropped images 186a-186y. As such, embeddings 187 having similar numerical inputs/values are indicative of cropped images 186 having similar products 190 depicted therein, and the control circuit 310 may be programmed to place embeddings 187 having similar numerical inputs/values close together in an embedding space (e.g., a cluster, as will be discussed in more detail below with reference to FIG. 8). In the embodiment illustrated in FIG. 7, only dense vector embeddings 187a, 187b, 187c, 187d, 187e, 187f, 187g, and 187y corresponding to the cropped images 186a, 186b, 186c, 186d, 186e, 186f, 186g, and 187y are shown (due to space constraints), but it will be appreciated that in step 720, the passing of the cropped images 186a-186y through the pretrained CNN 196 results in the generation of a dense vector embeddings 187a-187y corresponding to each of the cropped images 186a-186y.

Figure 8:
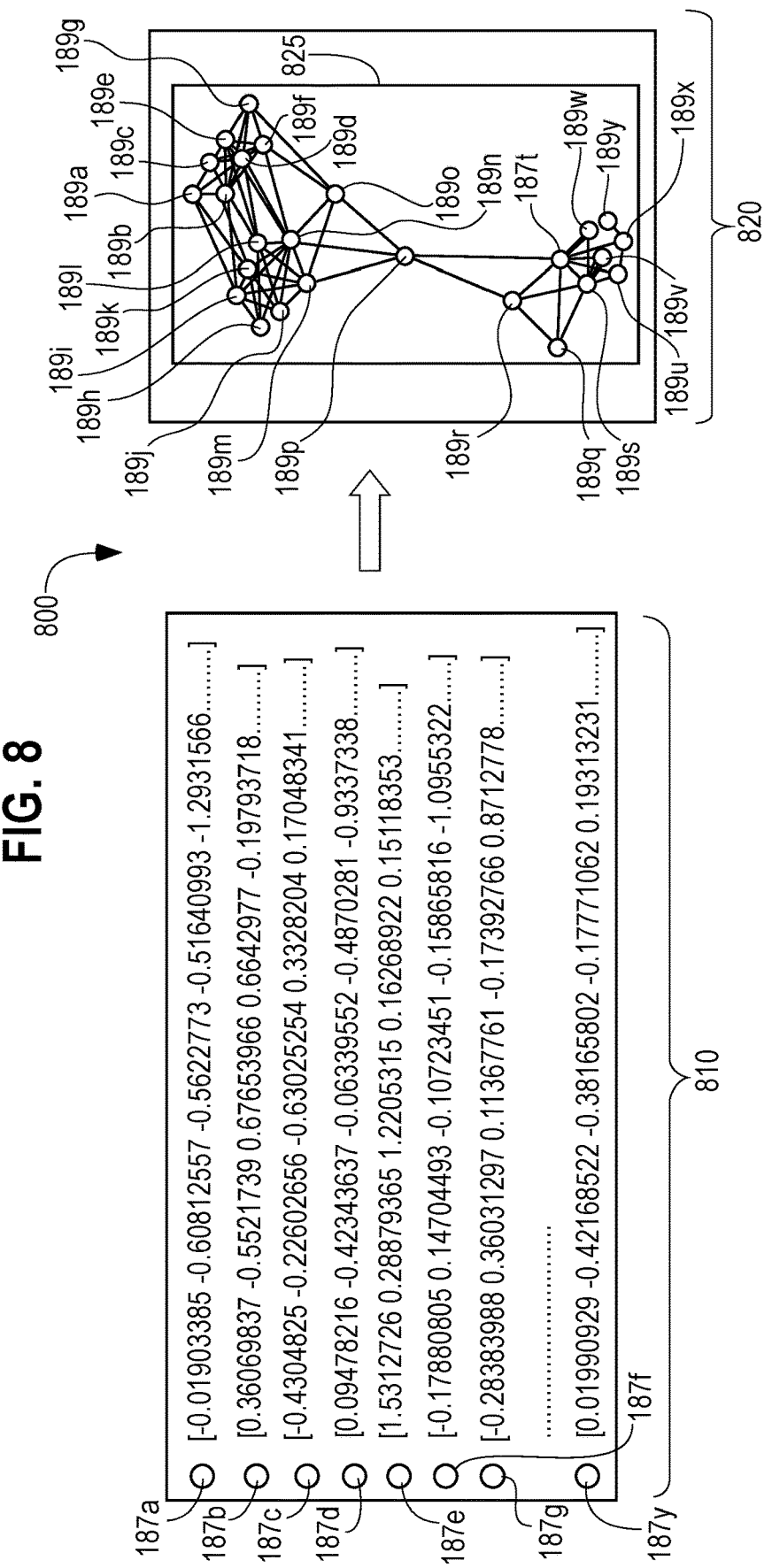
FIG. 8 is a flow diagram of an exemplary process of generating a cluster graph depicting clusters of the cropped images, wherein each cluster represents cropped images of an individual product in accordance with some embodiments.

In some implementations, the control circuit 310 is programmed to use the embeddings 187 of the cropped images 186 to create an image cluster graph 825 as shown in FIG. 8. In particular, in the exemplary method 800 depicted in FIG. 8, the control circuit 310 obtains the embeddings 187a-187y (e.g., from the electronic database 140) (step 810), and then, based on the obtained embeddings 187a-187y, generates an image cluster graph 825, such that each node 189a-189y (depicted in FIG. 8 as a circular dot) corresponds to a respective one of the cropped images 186a-186y, and such that each of the nodes 189a-189y is positioned in the image cluster graph 825 based on the level of similarity between the obtained embeddings 187a-187y (step 820).

In some aspects, the step 820 of generating the image cluster graph 825 includes the control circuit 310 using an appropriate threshold (e.g., a predetermined threshold) for distances to create edges between the nodes 189a-189y, and positioning the nodes 189a-189y into clusters using the Louvain method for community detection. As such, each cluster of nodes 189a-189y generated in the image cluster graph 825 represents a particular unique set of cropped images 186 having similar facings, lighting patterns, etc. In other words, based on the similarity of the embeddings 187a-187y generated for the cropped images 186a-186y, the nodes 189a-189g in FIG. 8 representing the cropped images 186a-186g of product 190a named BRAND 1 are positioned close to each other as a first cluster, the nodes 189h-189p in FIG. 8 representing the cropped images 186h-186p of product 190b named BRAND 2 are positioned close to each other as a second cluster, and the nodes 189q-189y in FIG. 8 representing the cropped images 186q-186y of product 190a named BRAND 3 are positioned close to each other as a third cluster.

In some embodiments, after the image cluster graph 825 is generated, the control circuit 310 is programmed to analyze the image cluster graph 825 and the nodes 189a-189y located in the image cluster graph 825 to select one of the cropped images that is most representative of the cluster with respect to providing an optimal visual representation of the product depicted in the cropped images represented by the clustered nodes 189, making this selected cropped image the keyword template reference image for the selected product. To that end, in the embodiment of FIG. 9, a method 900 includes obtaining (e.g., from the electronic database 140) the image cluster graph 825 generated in step 820 of method 800 (step 910), and analyzing the embeddings 187a-187y associated with the cropped images 186a-186y and the relative positions of the nodes 189a-189y corresponding to the cropped images 186a-186y to identify and select/designate a centroid for each of the clusters (step 920). In some embodiments, the control circuit 310 is programmed to identify a node 189 as a centroid for a given cluster of nodes 189 by calculating a sum of distances of each node 189 with respect to every other node 189 and choosing the node 189 with the least sum.

Figure 9:
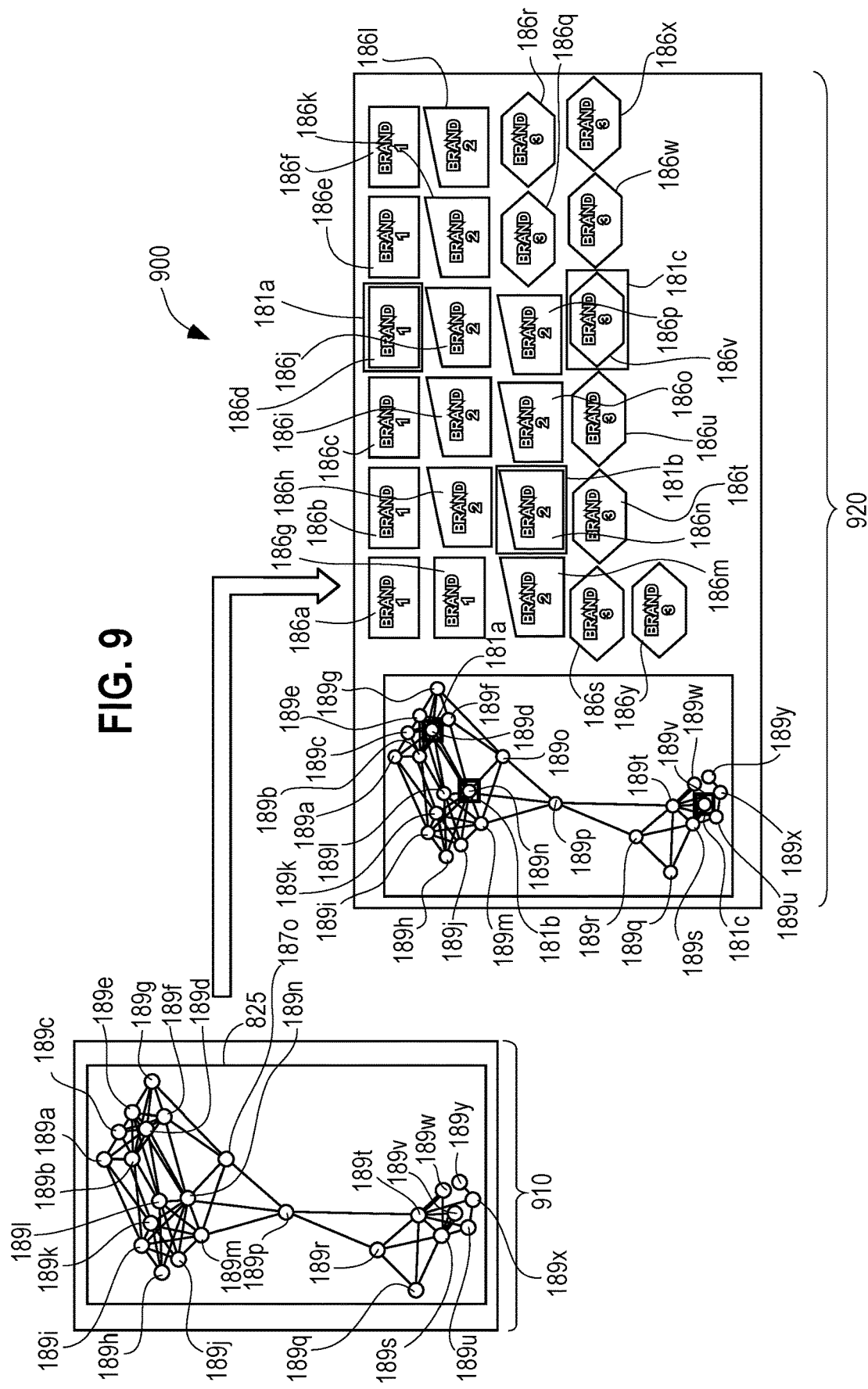
FIG. 9 is a flow diagram of an exemplary process of selecting a centroid image from the cropped image clusters of FIG. 8 in accordance with some embodiments.

In the exemplary method 900 shown in FIG. 9, the analysis in step 920 resulted in the control circuit 310 designating the node 189d as the centroid that represents an optimal representation of a keyword template reference image for the first cluster of cropped images 186a-186g (the selection of the node 189d by the control circuit 310 as the centroid is indicated in FIG. 9 by the line 181a surrounding the node 189d, but it will be appreciated that the line 181a is shown in FIG. 9 for ease of reference only). As can be seen in FIG. 9, the selection by the control circuit 310 of the node 189d as the centroid of the cluster of nodes 189a-189g representing the cropped images 186a-186g results in the cropped image 186d being identified and/or marked by the control circuit 310 as a keyword template reference image for product 190a named BRAND 1, which is depicted in the cropped images 186a-186g. For example, the control circuit 310 may send a signal to the electronic database 140 to update the electronic database 140 to mark the cropped image 186d as the keyword template reference image for product 190a, such that the cropped image 186d will be utilized as a keyword template reference image in identification of the products 190a subsequently captured on the product storage structure 115 by the image capture device 120.

By the same token, in the example illustrated in FIG. 9, the analysis in step 920 resulted in the control circuit 310 selecting the node 189n as the centroid that represents an optimal representation of a keyword template reference image for the second cluster of cropped images 186h-186p. As can be seen in FIG. 9, the selection by the control circuit 310 of the node 189n as the centroid of the cluster of nodes 189h-189p representing the cropped images 186h-186p results in the cropped image 186n being identified and/or marked by the control circuit 310 as a keyword template reference image for the product 190b named BRAND 2, which is depicted in the cropped images 186h-186p. For example, the control circuit 310 may send a signal to the electronic database 140 to update the electronic database 140 to mark the cropped image 186n as the keyword template reference image for product 190b, such that the cropped image 186n will be utilized as a keyword template reference image in identification of the products 190b subsequently captured on the product storage structure 115 by the image capture device 120.

Similarly, in the example illustrated in FIG. 9, the analysis in step 920 resulted in the control circuit 310 selecting the node 189v as the centroid that represents an optimal representation of a keyword template reference image for the third cluster of cropped images 186q-186y. As can be seen in FIG. 9, the selection by the control circuit 310 of the node 189v as the centroid of the cluster of nodes 189q-189y representing the cropped images 186q-186y results in the cropped image 186v being identified and/or marked by the control circuit 310 as a keyword template reference image for product 190c named BRAND 3, which is depicted in the cropped images 186q-186y. For example, the control circuit 310 may send a signal to the electronic database 140 to update the electronic database 140 to mark the cropped image 186v as the keyword template reference image for product 190c, such that the cropped image 186v will be utilized as a keyword template reference image in identification of the products 190c subsequently captured on the product storage structure 115 by the image capture device 120.

In some embodiments, after identifying the centroid node (i.e., 189d, 189n, and 189v) for each of the three node clusters and marking the corresponding cropped images (i.e., 186d, 186n, and 186v) as the keyword template reference images to facilitate future recognition/identification of products 190 in images 180 captured by the image capture device 120, the control circuit is also programmed to further process the image cluster graph 825 to generate a feature model template reference image for each of the individual products 190a-190c named BRAND 1, BRAND 2, and BRAND 3. In one aspect, after identifying the centroid node (i.e., 189d, 189n, and 189v) for each of the three node clusters, the control circuit is programmed to resample a number of the cropped images each one of the respective clusters that are located closest to the centroid nodes 189d, 189n, and 189v.

In some implementations, the control circuit 310 is programmed to select a number (e.g., a predetermined number, such as 3, 5, 10, 15, 20, etc.) of nodes 189 of a cluster that are located most proximally to their respective centroid nodes 189d, 189n, and 189v, and sample the cropped images corresponding to the selected nodes 189 such that the centroid image 186d, 186n, and 186v of each cluster, and a predetermined number of the selected resampled cropped images (located in their respective cluster most proximally to their respective centroid image) are marked as a feature model template for the respective one of the products BRAND 1, BRAND 2, and BRAND 3 associated with the respective ones of the cropped images 186a-186y. Such feature model templates, which include not only the centroid images of each cluster, but also multiple images located in the cluster most proximally to the centroid image are highly representative of the cluster features and facilitate a more accurate prediction by the control circuit 310 of whether a given product detected in one or more images 180 subsequently captured by the image capture device 120 corresponds to any one of products 190a-190c. In some aspects, the control circuit 310 may send a signal to the electronic database 140 to update the electronic database 140 to mark each centroid node 189d, 189n, and 189v of each cluster, in combination with the cropped images 186a-186y located most proximally to their respective centroid nodes 189d, 189n, and 189v in the cluster, as a feature model template to facilitate recognition/identification of the products 190 subsequently captured on the product storage structure 115 by the image capture device 120.

In some embodiments, as described in more detail below with reference to FIGS. 10-12D, the keyword model templates and/or feature model templates determined as described above for various products 190a-190c (based on analysis by the control circuit 310 of a first batch of cropped images 180a-180y) and stored in the electronic database 140 on that day may be updated by the control circuit 310 (e.g., on the next subsequent day) as a result of processing and analysis by the control circuit 310 of a second batch of new images 180 captured (e.g., on the next subsequent day) by the image capture device 120. In particular, FIG. 10 describes an exemplary method 1000 of updating model templates (e.g., keyword model templates and/or feature model templates) for use in recognizing individual products 190a-190f in images 180 captured by the image capture device 120 at the product storage facility.

Figure 10:
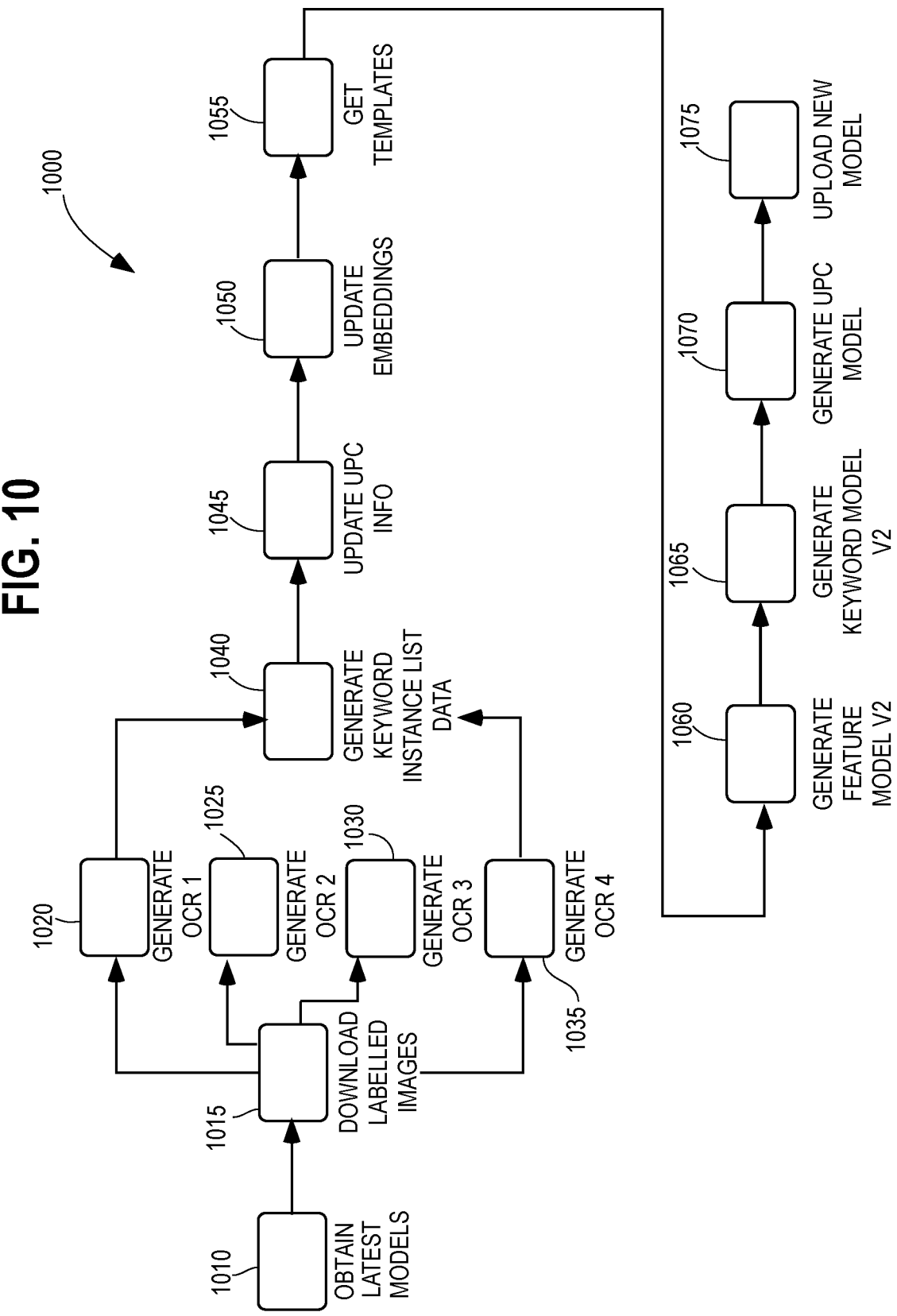
FIG. 10 is a flow diagram of a process of updating templates for use in recognizing products in images captured at a product storage facility in accordance with some embodiments.
Figure 11A:
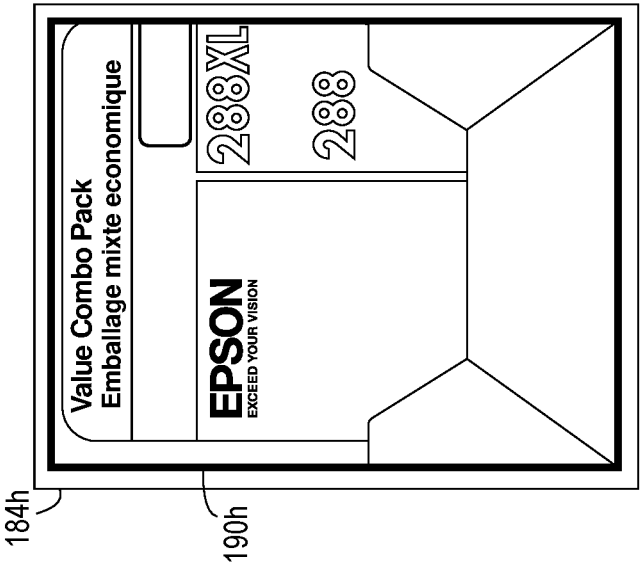
FIGS. 11A-11D are diagrams of cropped images of four exemplary products which are processed by meta data extraction and/or optical character recognition.
Figure 11B:
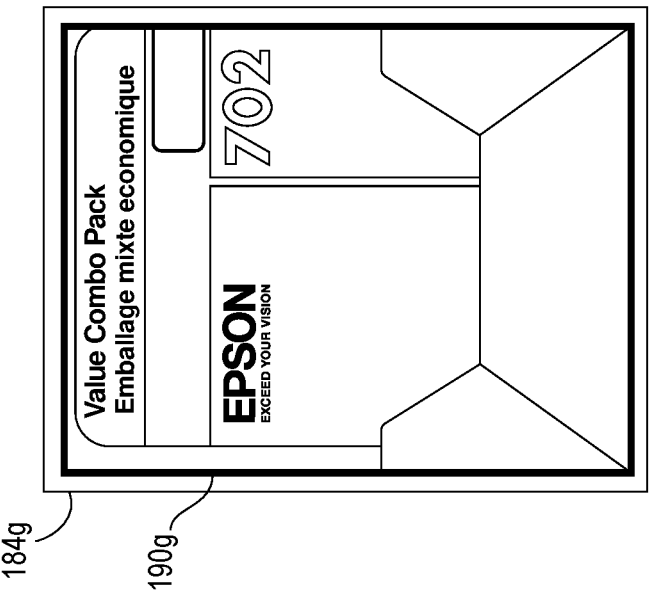
Figure 11D:
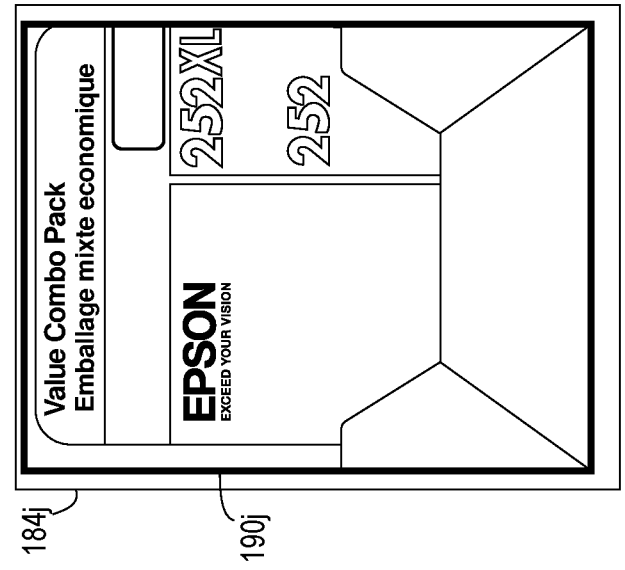
Figure 11C:
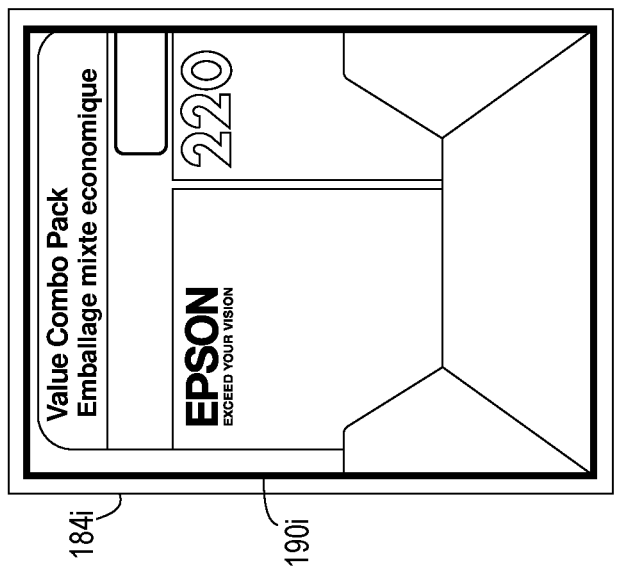

In the embodiment illustrated in FIG. 10, the exemplary method 1000 of updating the model templates that were created by the control circuit 310 based on a first batch of cropped images 184a-184f and/or 186a-186f as described above includes, obtaining by the control circuit 310 (e.g., from the electronic database 140) the latest keyword model templates and/or the feature model templates from the electronic database 140 (step 1010). Notably, the downloaded keyword model templates and/or feature model templates that are downloaded by the control circuit 310 from the electronic database 140 may be the exact keyword model templates and/or feature model templates that were generated by the control circuit 310 earlier in the day or on a preceding day, or may be keyword model templates and/or feature model templates that were modified (e.g., manually by a worker of the product storage facility 105) to correct any errors and/or discrepancies that were detected (e.g., by the worker) in the keyword model templates and/or feature model templates generated by the control circuit 310.

In some embodiments, the feature model templates associated with the products 190a-190c that were generated on a given day based on a first batch of images 180 of the products 190a-190c captured by the image capture device 120 are updated in view of a second batch of images 180 of the products 190a-190c captured by the image capture device 120. In one implementation, if any of the cropped images 186a-186y used by the control circuit 310 to generate the keyword model templates and/or feature model templates as described above are marked incorrect (e.g., by the worker), the control circuit 310 is programmed to remove such cropped images 186a-186y (and their associated embeddings) from the feature model template.

In the embodiment shown in FIG. 10, after the control circuit 310 obtains the latest keyword and feature models in step 1010, the control circuit 310 obtains (e.g., downloads from the electronic database 140) the cropped images 184a-184f depicting the products 190a-190f associated with the obtained previously generated keyword model and feature model templates (step 1015). Notably, the cropped images 184a-184f may be the images 184a-184f of a first batch of images 180 that were captured by the image capture device 120 earlier in the day or on a preceding day and used to initially generate the keyword and feature models as described above, or the cropped images 184a-184f may be cropped images 184a-184f of a second batch of images 180 that were captured by the image capture device 120 later in the day or o a subsequent day.

After the cropped images 184a-184f (which may be referred to herein as "training images") are obtained by the control circuit 310 in step 1015, in the embodiment illustrated in FIG. 10, the method 900 further includes processes the downloaded cropped images 184a-184f (e.g., via optical character recognition (OCR)) to detect various characters (e.g., keywords, numbers, symbols, images, etc.) that appear on the products 190a-190f (steps 1025, 1030, 1035, 1040). Notably, the optical character recognition processing does not have to be performed by the control circuit 310, and may instead be performed by an internet-based service 170 (e.g., Google OCR, etc.), after which the control circuit 310 obtains the characters extracted from the products 190a-190f from the cropped images 184a-184f by the internet-based service 170 from the internet-based service 170. In addition, it should be noted that while the exemplary FIG. 10 is representative of the extraction of characters OCR in steps 1025, 1030, 1035, 1040 from four products 190g-190j (which are depicted in FIGS. 11A-11D and will be discussed in more detail below), it will be appreciated that the control circuit 310 or the internet-based service 170 may perform character extraction (e.g., OCR) from dozens, hundreds, or thousands of cropped images simultaneously.

In the example shown in FIGS. 6A-6F, the data extracted from the product 190a-190f in cropped image 184a as a result of the OCR processing may include characters representing the name of the product 190a (in this case, "BRAND 1"). By the same token, the data extracted by the control circuit 310 (or the internet-based service 170) from the products 190b-190f in cropped images 184b-184f as a result of character extraction processing may include characters representing the name of the products 190a-190f, in this case, "BRAND 2-BRAND 6," respectively. In some aspects, if the control circuit 310 (or the internet-based service 170) extracts the characters (e.g., via OCR) from the cropped images 184a-184f depicting the products 190a-190f and detects a keyword in the extracted data, the control circuit 310 converts the detected keyword to a keyword instance that indicates the keyword (i.e., each letter or number or character of the keyword, in this case, BRAND 1, BRAND 2, BRAND 3, BRAND 4, BRAND 5, and BRAND 6), as well as the location of the keyword on each of the products 190a-190f.

FIGS. 11A-11D represent exemplary cropped images 184g-184j downloaded by the control circuit 310 in step 1015, which are associated with the keyword/feature model templates previously generated for exemplary products 190g-190j (in this exemplary instance, ink cartridges for a printer, models 702 (FIG. 11A), 288/288XL (FIG. 11B), 220 (FIG. 11C), and 252/252XL (FIG. 11D) downloaded by the control circuit 310 in step 1015. In the embodiment illustrated in FIG. 10, after the OCR is performed (by the control circuit 310 or the internet-based service 170) in steps 1020, 1025, 1030, 1035 to extract various characters from the cropped images 184a-184j, the exemplary method 1000 includes detecting keyword in the extracted data and converting the detected keyword to keyword instances that indicate the keyword (i.e., each letter or number or character of the keyword), as well as the location of the keyword on each of the products 190a-190j (step 1040). In the example shown in FIG. 11A, the data extracted from the product 190g in cropped image 184g as a result of the OCR processing includes various characters (e.g., keywords and numbers), for example, "EPSON," "EXCEED YOUR VISION," "Value Combo Pack," "Emballage mixte economique," and "702." The characters "EPSON," "EXCEED YOUR VISION," "Value Combo Pack," "Emballage mixte economique" were also extracted by OCR from each of the products 190h-190j, with the difference being that instead of the characters "702" that were extracted from the product 190g shown in FIG. 11A, characters "288" and "288XL" were extracted from the product 190h shown in FIG. 11B, characters "220" were extracted from the product 190i shown in FIG. 11C, and characters "252" and "252XL" were extracted from the product 190h shown in FIG. 11D.

In the illustrated embodiment, after the characters on the portions of the cropped images 184g-184j corresponding to the products 190g-190j are detected and converted to keyword instances, the exemplary method 1000 of FIG. 10 further includes the control circuit 310 correlating the characters extracted from the products 190g-190j to the inventory data stored in the electronic database 140 to update/predict the known product identifiers (e.g., UPC code, product name, etc.) that correspond (e.g., match) the characters extracted from the products 190g-190j (step 1045). In other words, this correlation of the characters extracted from the cropped images 190g-190j to the product information stored in the electronic database enables the control circuit 310 to predict (with high certainty) which of the cropped images 184g-184j of the products 190g-190j contain product information that matches the product information stored in the product catalog in the electronic database 140. In the illustrated example, the control circuit predicted that the product 190g of FIG. 11A corresponds to UPC 00010343953840 (labeled 191g) as seen in FIG. 12A, the product 190g of FIG. 11A corresponds to UPC 00010343953840 (labeled 191h) as seen in FIG. 12A, the product 190i of FIG. 11C corresponds to UPC 00010343919174 (labeled 191i) as seen in FIG. 12C, and the product 190j of FIG. 11D corresponds to UPC 00010343917965 (labeled 191j) as seen in FIG. 12D.

In the embodiment illustrated in FIG. 10, after the control circuit 310 predicts the known product identifiers of the products 190g-190j and updates the UPC information associated with the products 190g-190j in step 1045, the exemplary method 1000 further includes control circuit 310 processing each of the cropped images 184g-184j to convert the features extracted from each of the cropped images 186g-186j into dense vector representations, also known as embeddings 187, for each of the textual features extracted from each of the cropped images 186g-186j, and to update the embeddings that are associated with keyword and feature model templates associated with the products 190g-190j depicted in the cropped images 186g-186j (step 1050).

For example, in instances such as illustrated in FIG. 10, where certain newly-acquired cropped images 186g-186j are determined by the control circuit 310 to have embeddings with numerical values that are located on an image cluster graph (see FIGS. 7-9) closer to a centroid image previously determined for one or more of respective ones of the products 190g-190j, such a determination by the control circuit 310 would warrant the control circuit 310 obtaining the previously generated feature vector template (step 1055) and updating the previously generated feature model template for such products by generating a new (i.e., updated) feature model template for such products (step 1060). In some implementations, based on the extraction of keywords and the generation of a keyword instance list for each of the products 190g-190j in step 1040 as described above, the control circuit 310 obtains the keyword model template for each of the products 190g-190j in step 1055 for purposes of updating the keyword model template for the products 190g-190j as follows.

FIGS. 12A-12D show exemplary keyword lists generated by the control circuit 310 in step 1040 based on the character extraction (e.g., OCR) processing of the cropped images 186g-186j. In particular, in the embodiment shown in FIGS. 12A-12D, the control circuit 310 correlates/processes the characters (e.g., keywords, numbers, etc.) extracted from each of the products 190g-190j depicted in the images 190g-190j associated with the obtained feature and/or keyword model templates to identify products 190g-190j that are similar, i.e., products 190g-190j that share a number (e.g., a predetermined number) of characters (e.g., keywords, numbers, etc. also referred to herein as "high frequency words") with each other, but also do not share a number (e.g., a predetermined number) of characters (e.g., keywords, numbers, etc.) by virtue of being similar but not identical to one another.

In the example illustrated in FIGS. 12A-12D, the "high frequency" keywords detected on each of the products 190g-190j are: "epson," "exceed," "your," "vision," "value," "combo," "pack," "emballage," "mixte," and "economique," i.e., 10 high frequency keywords 199g-199j (i.e., shared keywords). In an embodiment, where the control circuit 310 is programmed to consider certain ones of the products 190g-190j to be similar if they share 10 or more "high frequency" keywords 199g-199j, the products 190g-190j meet the "similar" product criteria, but products that do not have 10 keywords in common with products 190g-190j would be discarded and not included in the "similar" product list with the products 190g-190j. It is understood that the number of keywords programmed into the control circuit 310 to associate certain products as "similar" products does not have to be 10 shared keywords, and may be less than 10 (e.g., 5, etc.) shared keywords, or more than 10 shared (e.g., 15, etc.).

In some embodiments, the control circuit 310 is programmed to determine a list of "must keywords" 195g-195j for the keyword model template that each of the products 195g-195j must contain in order to be properly recognized as being associated with a respective one of the UPCs 195g-195j. For example, in the illustrated embodiment, the product 190g is Epson ink cartridge model 702, which means that all products that are identical to the product 190g must have the characters 702 on them (otherwise, they will not be Epson model 702 ink cartridge, but will instead be a similar, but a different Epson model ink cartridge, e.g., model 220, 288, 288XL, 252, 252XL, etc.), and which also means that the control circuit 310 would set the keyword "702" as a "must keyword" 195g (see FIG. 12A) for the product 190g of FIG. 11A. By the same token, for Epson ink cartridge model 288/288XL of FIG. 11B, the control circuit 310 would set the keywords "288" and "288XL" as "must keywords" 195h (see FIG. 12B); for Epson ink cartridge model 220 of FIG. 11C, the control circuit 310 would set the keyword "220" as a "must keyword" 195i (see FIG. 12C), and for Epson ink cartridge model 252/252XL of FIG. 11D, the control circuit 310 would set the keywords "252" and "252XL" as "must keywords" 195j (see FIG. 12D).

In the illustrated embodiment, after the control circuit 310 determines "must keywords" 195g-195j for the keyword model templates associated with the products 190g-190j, the control circuit 310 is programmed to generate, based on the "must keywords" 195g-195j the "negative keywords" for the keyword model template associated with the products 190g-190j. In particular, as shown in the embodiment of FIGS. 12A-12D, the control circuit 310 is programmed to interpret each keyword that is a "must keyword" of a keyword model template for one of the products 190g-190j to be a "negative keyword" for the other one of the products 190g-190j.

In particular, as can be seen in FIG. 12A, for the keyword model template associated with the product 190g, the unique model number (i.e., "702") of the product 190g is a "must keyword" 195g for the product 190g, since the keyword "702" always appears only on the product 190g, but does not appear on any of the products 190h-190j, making the keyword "702" a negative keyword for each of products 190h-190j. By the same token, as can be seen in FIG. 12B, for the keyword model template associated with the product 190h, the unique model number (i.e., "288/288XL") of the product 190h is a "must keyword" 195h for the product 190h, since the keyword "288/288XL" always appears only on the product 190h, but does not appear on any of the products 190g, 190i, or 190j, making the keywords "288" and "288XL" negative keywords for each of products 190g, 190i, and 190j. Similarly, FIG. 12C shows that, for the keyword model template associated with the product 190i, the unique model number (i.e., "220") of the product 190i is a "must keyword" 195i for the product 190i, since the keyword "220XL" always appears only on the product 190i, but does not appear on any of the products 190*g*, 190*h*, or 190*j*, making the keyword "220" a negative keyword for each of products 190*g*, 190*h*, and 190*j*. Finally, FIG. 12D shows that, for the keyword model template associated with the product 190*j*, the unique model number (i.e., "252/252XL") of the product 190*j* is a "must keyword" 195*j* for the product 190*j*, since the keyword "252/252XL" always appears only on the product 190*j*, but does not appear on any of the products 190*g*, 190*h*, or 190*i*, making the keywords "252" and "252XL" negative keywords for each of products 190*g*, 190*i*, and 190*j*.

In the illustrated embodiment, after the control circuit 310 determines and sets "must keywords" 195*g*-195*j* and "negative keywords" 197*g*-197*j* for the keyword model templates associated with the products 190*g*-190*j*, the exemplary method 1000 of FIG. 10 further includes the control circuit 310 updating the previously generated keyword model template for the products 190*g*-190*j* by generating a new (i.e., updated) keyword model template for the products 190*g*-190*j* (step 1065). After the feature model template for each of the products 190*g*-190*j* is updated in step 1060, and after the keyword model template for each of the products 190*g*-190*j* is updated in step 1065, the exemplary method 1000 further includes the control circuit 310 generating a new/updated UPC model for each of the products 190*g*-190*j*, which updated UPC model incorporates the updated feature model and keyword model templates (step 1070), and transmitting (e.g., uploading) the new/updated UPC model generated for each of the products 190*g*-190*j* in step 1070 to the electronic database 140, which, as mentioned above, may be cloud-based (step 1075). In some embodiments, after the control circuit 310 transmits the new UPC models including the updated keyword model and feature model templates including the "must keywords" 195*g*-195*j* and the "negative keywords" for each of the similar recognized products 190*g*-190*j* to the electronic database 140 for storage, these updated keyword model and feature model templates may be used by the control circuit 310 for analysis of subsequent images 180 captured by the image capture device 120 at the product storage facility 105 to recognize (e.g., predict the known product identifiers of) the products 190*a*-190*f* depicted/detected in the subsequent images 180.

The above-described embodiments advantageously provide for inventory management systems and methods, where the individual products detected on the product storage structures of a product storage facility can be efficiently detected and identified. As such, the systems and methods described herein provide for an efficient and precise recognition of products on product storage structures of a product storage facility, and also provide for an efficient and precise way to update the model templates used to recognize the products, thereby providing a significant cost savings to the retailer by saving the retailer thousands of worker hours that would be normally spent by workers of the retailer to manually monitor the on-shelf products.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS OF USING CACHED IMAGES TO DETERMINE PRODUCT COUNTS ON PRODUCT STORAGE STRUCTURES OF A PRODUCT STORAGE FACILITY filed Jan. 24, 2023, application Ser. No. 18/158,969; entitled METHODS AND SYSTEMS FOR CREATING REFERENCE IMAGE TEMPLATES FOR IDENTIFICATION OF PRODUCTS ON PRODUCT STORAGE STRUCTURES OF A RETAIL FACILITY filed Jan. 24, 2023, application Ser. No. 18/158,983; entitled SYSTEMS AND METHODS FOR PROCESSING IMAGES CAPTURED AT A PRODUCT STORAGE FACILTY filed Jan. 24, 2023, application Ser. No. 18/158,925; and entitled SYSTEMS AND METHODS FOR PROCESSING IMAGES CAPTURED AT A PRODUCT STORAGE FACILTY filed Jan. 24, 2023, application Ser. No. 18/158,950; entitled SYSTEMS AND METHODS FOR ANALYZING AND LABELING IMAGES IN A RETAIL FACILITY filed January, 2023, Application No.; entitled SYSTEMS AND METHODS FOR ANALYZING DEPTH IN IMAGES OBTAINED IN PRODUCT STORAGE FACILITIES TO DETECT OUTLIER ITEMS filed January, 2023, Application No.; entitled SYSTEMS AND METHODS FOR REDUCING FALSE IDENTIFICATIONS OF PRODUCTS HAVING SIMILAR APPEARANCES IN IMAGES OBTAINED IN PRODUCT STORAGE FACILITIES filed January, 2023, Application No.; entitled SYSTEMS AND METHODS FOR IDENTIFYING DIFFERENT PRODUCT IDENTIFIERS THAT CORRESPOND TO THE SAME PRODUCT filed January, 2023, Application No.; entitled SYSTEMS AND METHODS FOR RECOGNIZING PRODUCT LABELS AND PRODUCTS LOCATED ON PRODUCT STORAGE STRUCTURES OF PRODUCT STORAGE FACILITIES filed, 2023, Application No.; and entitled SYSTEMS AND METHODS FOR DETECTING SUPPORT MEMBERS OF PRODUCT STORAGE STRUCTURES AT PRODUCT STORAGE FACILITIES, filed Jan. 30, 2023, Application No.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system of updating templates for use in recognizing individual products in images captured at a product storage facility, the system comprising:
an image capture device having a field of view that includes at least a portion of a product storage structure of the product storage facility, the product storage structure having the individual products arranged thereon, wherein the image capture device is configured to capture one or more images of the product storage structure;
a computing device including a control circuit, the computing device being communicatively coupled to the image capture device; and
an electronic database configured to store keyword model templates and feature model templates associated with the images of previously recognized individual products stored at the product storage facility, wherein the keyword model templates includes an image of a recognized individual product and meta data associated with the recognized individual product, and wherein the feature model templates include the image of the recognized individual product in association with visual features of the recognized individual product;
wherein the control circuit of the computing device is configured to:
obtain at least one of the keyword model templates and feature model templates stored in the electronic database;
extract one or more keywords from each recognized individual product depicted in captured images associated with the obtained at least one of the keyword model templates;
correlate the one or more keywords extracted from each recognized individual product depicted in the images associated with the at least one of the keyword model templates to identify similar products, where the similar products share a number of keywords with each other and do not share a number of keywords with each other;
update a keyword model template for each of the similar products to:
set keywords that are unique to the similar products as must keywords; and
set the must keywords that are not shared between the similar products as negative keywords;
transmit the updated keyword model template including the must keywords and the negative keywords for each of the similar products to the electronic database for storage to be used for analysis of subsequent images captured by the image capture device, and recognition of products in the subsequent images;
obtain images of the product storage structure captured by the image capture device;
analyze the obtained images to detect individual ones of the individual products located on the product storage structure;
based on detection of the individual ones of the individual products in the obtained images, recognize the individual ones of the individual products detected in the obtained images as corresponding to a known product identifier;
crop each of the individual ones of the recognized individual ones of the individual products from the images to generate a plurality of cropped images;
create a plurality of image clusters using the plurality of cropped images, wherein each of the plurality of image clusters contains cropped images that depict an identical one of the recognized individual ones of the individual products corresponding to the known product identifier;
select one of the cropped images in each of the plurality of image clusters as a centroid image, wherein the centroid image is designated as the updated keyword model template representing the identical one of the recognized individual ones of the individual products;
resample a number of the cropped images of each of the plurality of clusters that are located closest to the centroid image by virtue of having embeddings that are most similar to embeddings of the centroid image; and
select the centroid image and the resampled number of cropped images as an updated feature model template representing the one of the recognized individual ones of the individual products.

2. The system of claim 1, wherein the image capture device comprises a motorized robotic unit that includes wheels that permit the motorized robotic unit to move about the product storage facility, and a camera to permit the motorized robotic unit to capture the one or more images of the product storage structure.

3. The system of claim 1, wherein the control circuit sets keywords that are shared between the similar products as high frequency keywords.

4. The system of claim 1, wherein the keyword model templates and the feature model templates are generated based on processing, by the control circuit of the computing device, of a first batch of the images of the product storage structure from the obtained images to crop the products detected in the first batch of the images to generate a first batch of cropped images, each of the cropped images of the first batch depicting an individual one of the products detected in the first batch.

5. The system of claim 4, wherein:
the obtained images further include a second batch of the images of the product storage structure captured by the image capture device; and
cropped images of the first batch that correspond to the known product identifier and cropped images of the second batch are combined to create the plurality of image clusters.

6. The system of claim 5, wherein the control circuit is programmed to:
generate embeddings for each of the cropped images of the second batch, wherein the embeddings represent dense vector representations of the cropped images of the second batch;
determine a similarly of the embeddings between the cropped images of the second batch in each of the plurality of image clusters; and
position the cropped images of the second batch in each of the plurality of image clusters based on a similarity between the embeddings of the cropped images of the second batch in each of the plurality of image clusters.

7. The system of claim 6,
wherein the control circuit is programmed to perform optical character recognition to detect one or more keywords from each of the individual products depicted in the cropped images of the second batch; and
wherein the updated keyword model template includes additional keywords detected via the optical character recognition in at least one of the cropped images of the second batch.

8. The system of claim 6,
wherein the control circuit is programmed to correlate embeddings of the cropped images of the first batch used to generate the keyword model templates and the feature model templates stored in the electronic database with the embeddings generated by the control circuit for the cropped images of the second batch; and wherein the updated feature model template includes at least some of the embeddings associated with the cropped images of the second batch.

9. The system of claim 6,
wherein the control circuit is programmed to remove at least one of the cropped images of the first batch from one of the feature model templates previously stored in the electronic database based on a determination that the at least one of the cropped images of the first batch was incorrectly associated with the one of the feature model templates previously stored in the electronic database; and
wherein the control circuit is programmed to remove at least one of the cropped images of the second batch from the updated feature model template based on a determination that the at least one of the cropped images of the second batch was incorrectly associated with the updated feature model template.

10. A method of updating templates for use in recognizing individual products in images captured at a product storage facility, the method comprising:
capturing one or more images of a product storage structure of the product storage facility by an image capture device having a field of view that includes at least a portion of the product storage structure, the product storage structure having the individual products arranged thereon;
storing, in an electronic database, keyword model templates and feature model templates associated with the images of previously recognized individual products stored at the product storage facility, wherein the keyword model templates includes an image of a recognized individual product and meta data associated with the recognized individual product, and wherein the feature model templates include the image of the recognized individual product in association with visual features of the recognized individual product;
by a computing device including a control circuit and communicatively coupled to the image capture device:
obtaining at least one of the keyword model templates and feature model templates stored in the electronic database;
extracting one or more keywords from each recognized individual product depicted in captured images associated with the obtained at least one of the keyword model templates;
correlating the one or more keywords extracted from each recognized individual product depicted in the images associated with the at least one of the keyword model templates to identify similar products, where the similar products share a number of keywords with each other and do not share a number of keywords with each other;
updating a keyword model template for each of the similar products to:
set keywords that are unique to the similar products as must keywords; and
set the must keywords that are not shared between the similar products as negative keywords;
transmitting the updated keyword model template including the must keywords and the negative keywords for each of the similar products to the electronic database for storage to be used for analysis of subsequent images captured by the image capture device, and recognition of products in the subsequent images;
obtaining images of the product storage structure captured by the image capture device;
analyzing the obtained images to detect individual ones of the individual products located on the product storage structure;
based on detection of the individual ones of the individual products in the obtained images, recognizing the individual ones of the individual products detected in the obtained images as corresponding to a known product identifier;
cropping each of the individual ones of the recognized individual ones of the individual products from the images to generate a plurality of cropped images;
creating a plurality of image clusters using the plurality of cropped images, wherein each of the plurality of image clusters contains cropped images that depict an identical one of the recognized individual ones of the individual products corresponding to the known product identifier;
selecting one of the cropped images in each of the plurality of image clusters as a centroid image, wherein the centroid image is designated as the updated keyword model template representing the identical one of the recognized individual ones of the individual products;
resampling a number of the cropped images of each of the plurality of clusters that are located closest to the centroid image by virtue of having embeddings that are most similar to embeddings of the centroid image; and
selecting the centroid image and the resampled number of cropped images as an updated feature model template representing the one of the recognized individual ones of the individual products.

11. The method of claim 10, wherein the image capture device comprises a motorized robotic unit that includes wheels that permit the motorized robotic unit to move about the product storage facility, and a camera to permit the motorized robotic unit to capture the one or more images of the product storage structure.

12. The method of claim 10, further comprising, by the control circuit, setting keywords that are shared between the similar products as high frequency keywords.

13. The method of claim 10, wherein the keyword model templates and the feature model templates are generated based on processing, by the control circuit of the computing device, of a first batch of the images of the product storage structure from the obtained images to crop the products detected in the first batch of the images to generate a first batch of cropped images, each of the cropped images of the first batch depicting an individual one of the products detected in the first batch.

14. The method of claim 13, wherein:
the obtained images further include a second batch of the images of the product storage structure captured by the image capture device; and
cropped images of the first batch that correspond to the known product identifier and cropped images of the second batch are combined to create the plurality of image clusters.

15. The method of claim 14, further comprising, by the control circuit:
generating embeddings for each of the cropped images of the second batch, wherein the embeddings represent dense vector representations of the cropped images of the second batch;

determining a similarly of the embeddings between the cropped images of the second batch in each of the plurality of image clusters; and positioning the cropped images of the second batch in each of the plurality of image clusters based on a similarity between the embeddings of the cropped images of the second batch in each of the plurality of image clusters.

16. The method of claim 15, further comprising, performing, by the control circuit, optical character recognition to detect one or more keywords from each of the individual products depicted in the cropped images of the second batch, wherein the updated keyword model template includes additional keywords detected via the optical character recognition in at least one of the cropped images of the second batch.

17. The method of claim 15, further comprising, by the control circuit, correlating embeddings of the cropped images of the first batch used to generate the keyword model templates and the feature model templates stored in the electronic database with the embeddings generated by the control circuit for the cropped images of the second batch, wherein the updated feature model template includes at least some of the embeddings associated with the cropped images of the second batch.

18. The method of claim 15, further comprising, by the control circuit:

removing at least one of the cropped images of the first batch from one of the feature model templates previously stored in the electronic database based on a determination that the at least one of the cropped images of the first batch was incorrectly associated with the one of the feature model template previously stored in the electronic database; and removing at least one of the cropped images of the second batch from the updated feature model template based on a determination that the at least one of the cropped images of the second batch of images was incorrectly associated with the updated feature model template.

* * * * *